(12) United States Patent
Bouwkamp

(10) Patent No.: US 6,474,356 B2
(45) Date of Patent: Nov. 5, 2002

(54) DEVICE FOR CONTROLLING A LIQUID FLOW

(76) Inventor: Gertjan Roelof Bouwkamp, Sophiastraat 17, Nuenen (NL), 5671 XJ ( * ) Notice: Subject to any disclaimer, the term of this patent is extended or adjusted under 35 U.S.C. 154(b) by 0 days.

(21) Appl. No.: 09/986,321

(22) Filed: Nov. 8, 2001

(65) Prior Publication Data

US 2002/0043283 A1 Apr. 18, 2002

Related U.S. Application Data

(63) Continuation of application No. 09/355,988, filed as application No. PCT/NL98/00106 on Feb. 23, 1998.

(30) Foreign Application Priority Data

Feb. 25, 1997 (NL) .......................................... 10 05 369

(51) Int. Cl.[7] .............................................. F16K 13/10
(52) U.S. Cl. ...................... 137/144; 137/142; 137/209; 137/210
(58) Field of Search ................................. 137/130, 135, 137/142, 144, 413, 453, 209, 574, 251.1, 210

(56) References Cited

U.S. PATENT DOCUMENTS

| | | | | |
|---|---|---|---|---|
| 298,805 A | * | 5/1884 | Weeden | 137/135 X |
| 660,178 A | * | 10/1900 | Ball | 137/142 |
| 963,231 A | * | 7/1910 | Mahoney | 137/135 X |
| 3,424,186 A | * | 1/1969 | Sparks | 137/209 X |
| 4,024,060 A | * | 5/1977 | Hughes | 137/209 X |
| 4,887,667 A | * | 12/1989 | Kuhara | 137/142 X |
| 5,009,261 A | * | 4/1991 | Kuhara | 137/142 X |
| 5,282,487 A | * | 2/1994 | Timpant | 137/574 X |
| 5,540,257 A | * | 7/1996 | Guilleux | 137/574 X |

FOREIGN PATENT DOCUMENTS

| | | | |
|---|---|---|---|
| DE | 973002 | * | 11/1959 |
| DE | 1296845 | * | 7/1969 |
| FR | 645285 | * | 10/1928 |
| FR | 1367596 | * | 11/1964 |
| FR | 1406918 | * | 11/1965 |
| GB | 827001 | * | 1/1960 |

* cited by examiner

*Primary Examiner*—John Rivell
(74) *Attorney, Agent, or Firm*—Jacobson Holman PLLC

(57) ABSTRACT

A device for controlling a liquid flow by a gas pressure. The device includes a pressure chamber, in which an overpressure, an underpressure or atmospheric pressure may prevail. The pressure in the pressure chamber can be used for allowing the liquid flow to pass or for stopping the liquid flow. Furthermore the liquid flow can be limited to a predetermined rate of flow. The device may interalia be used in sewage systems, hydraulic engineering works and irrigation works.

9 Claims, 21 Drawing Sheets

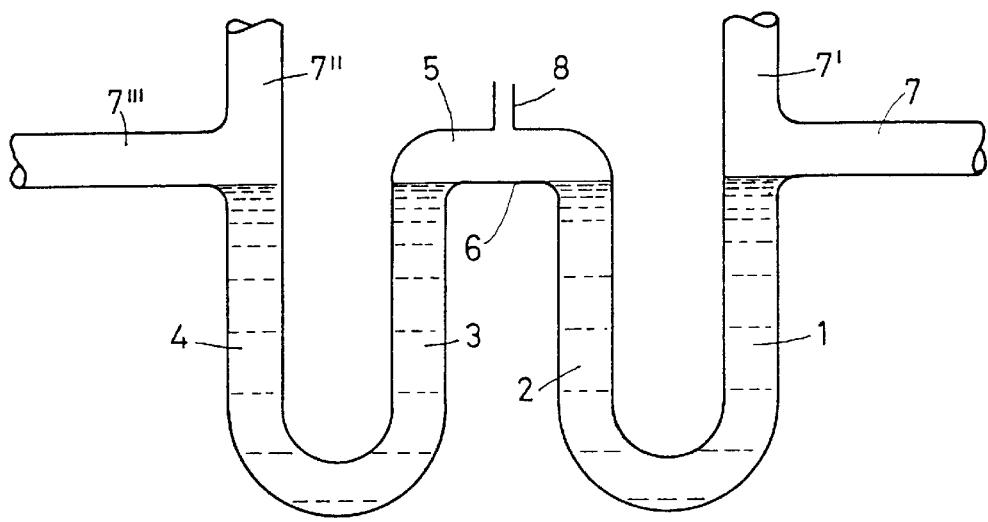
FIG.1-I
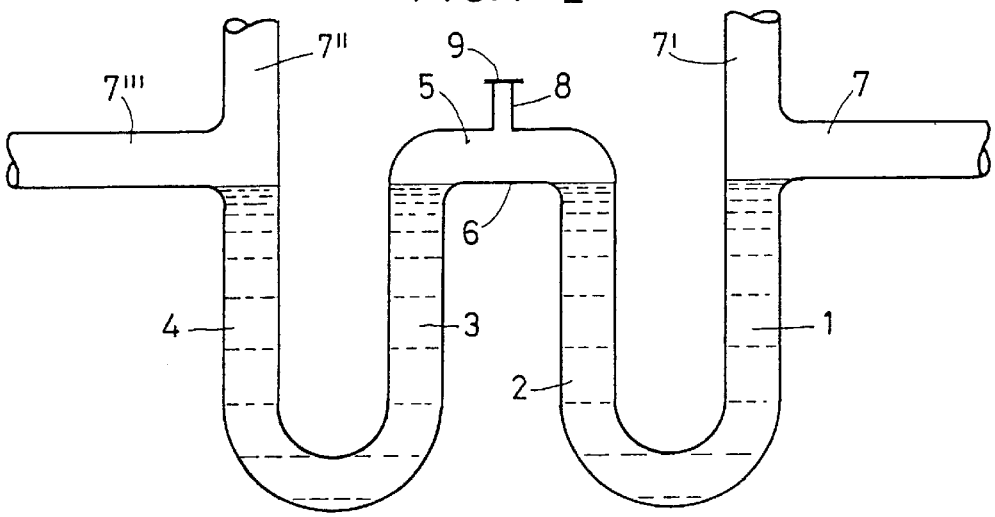
FIG.1-II
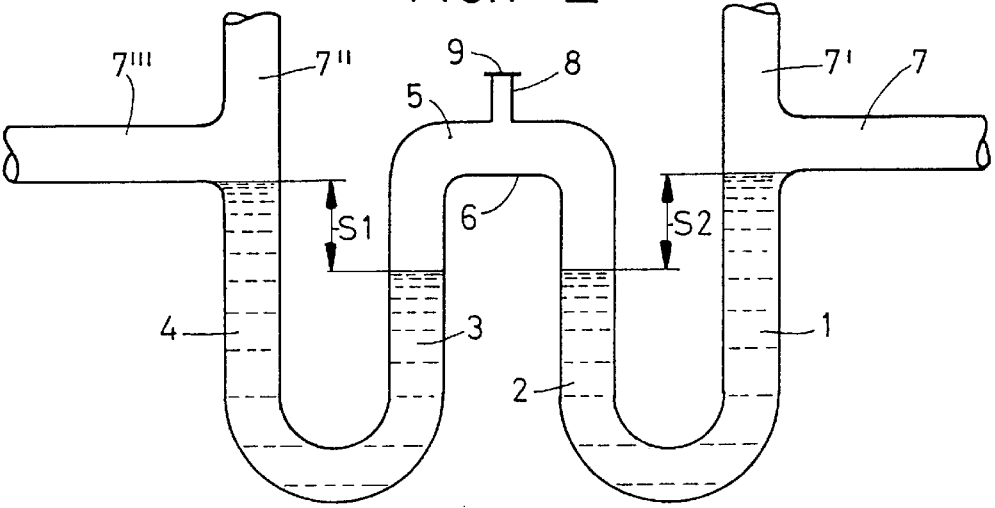
FIG.1-III

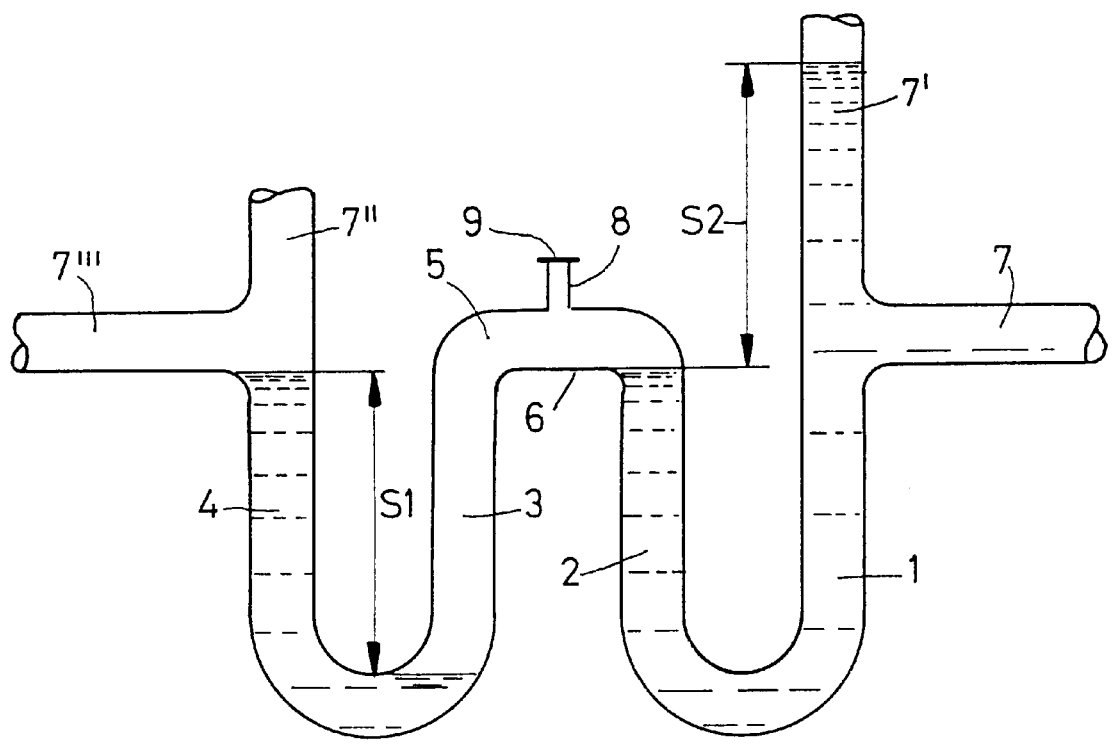
FIG.1-IV
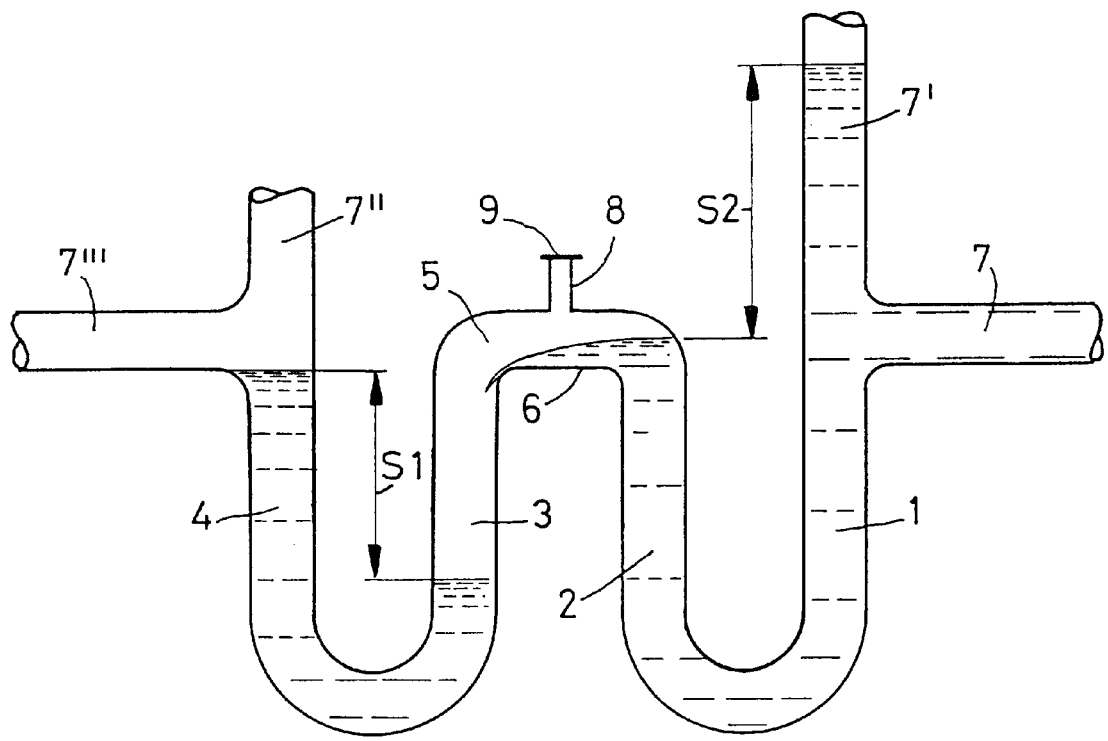
FIG.1-V

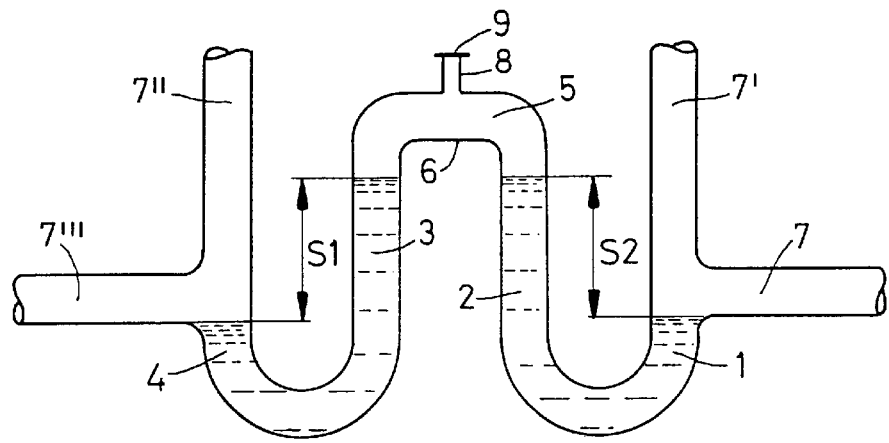
FIG.1-Ⅵ
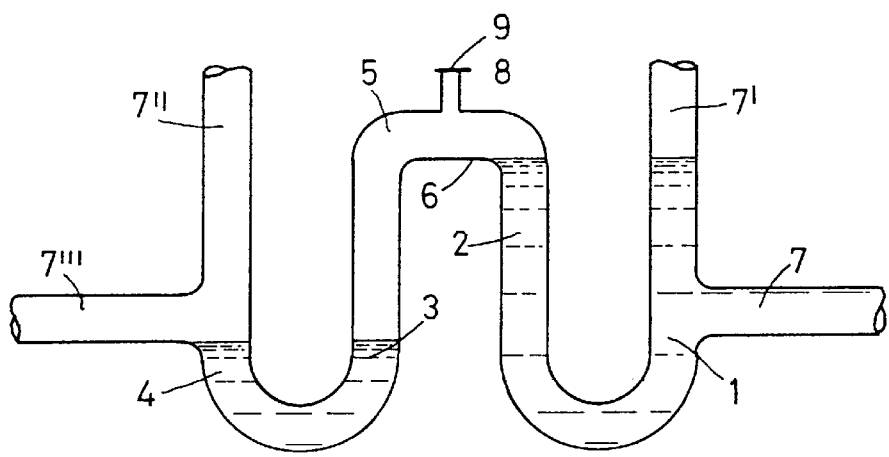
FIG.1-Ⅶ
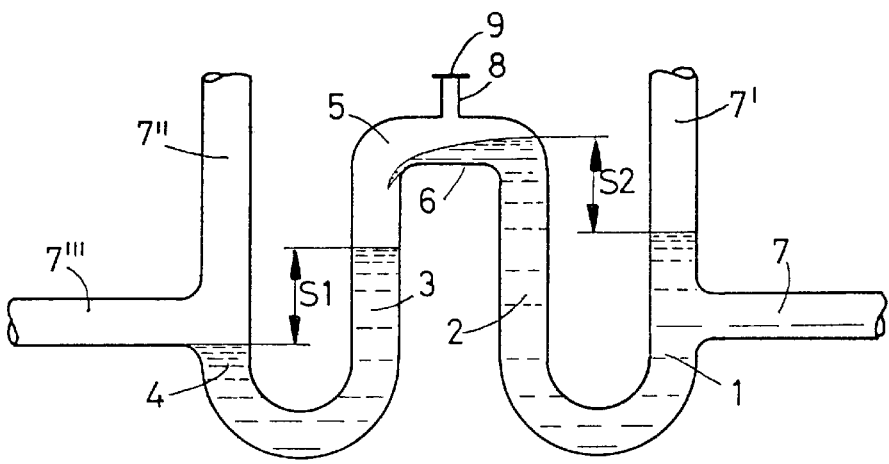
FIG.1-Ⅷ

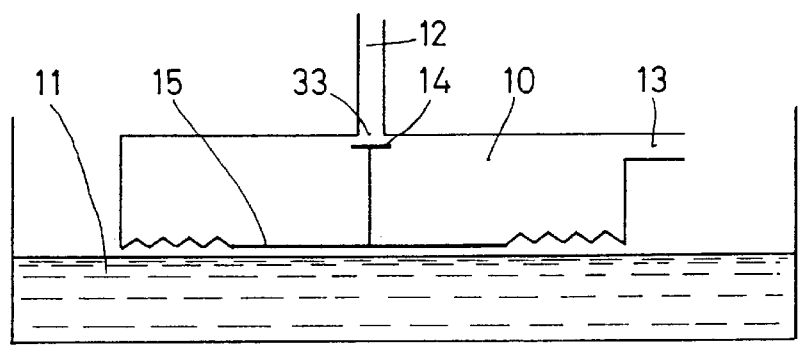
FIG. 2-I
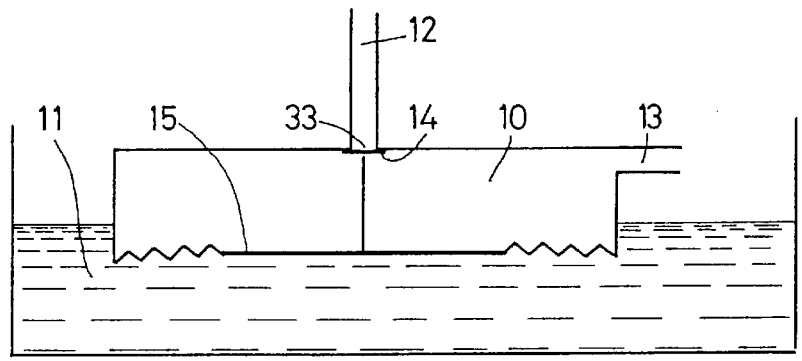
FIG. 2-II
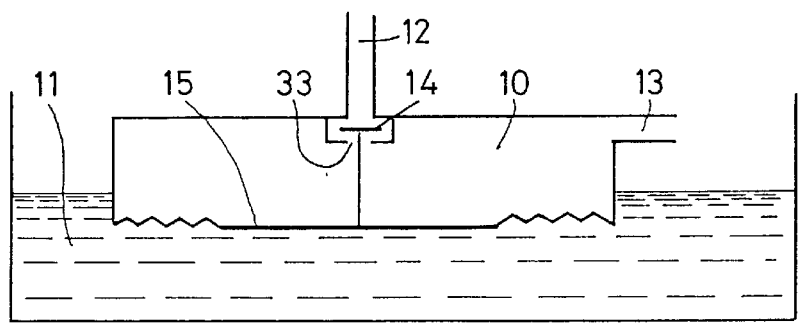
FIG. 2-III
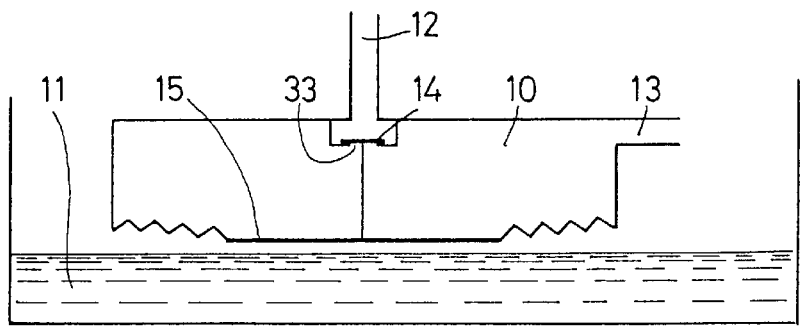
FIG. 2-IV

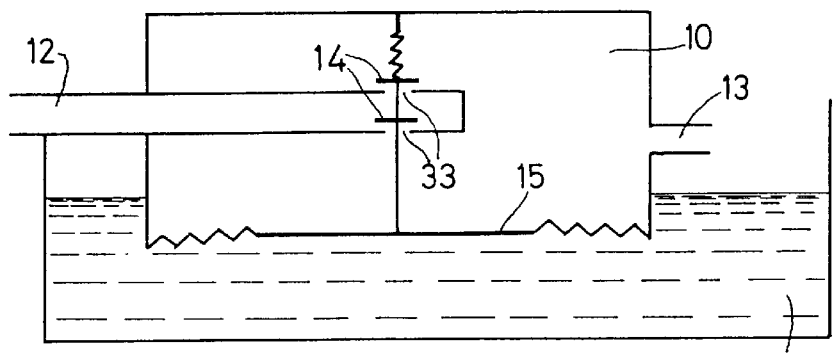
FIG. 2A-I
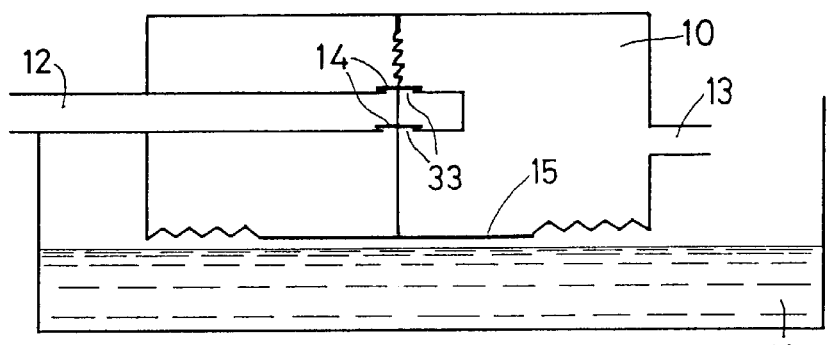
FIG. 2A-II
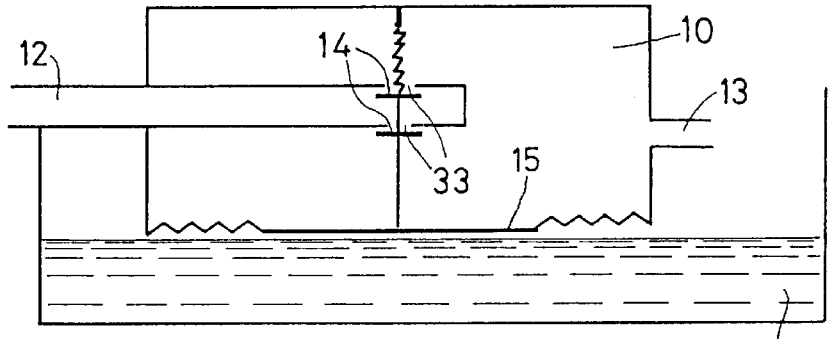
FIG. 2A-III
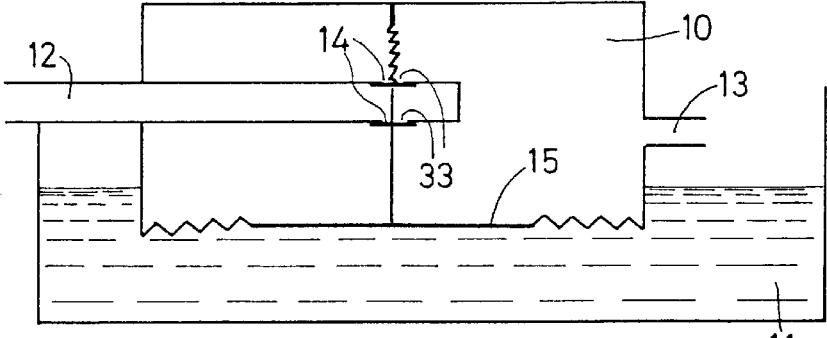
FIG. 2A-IV

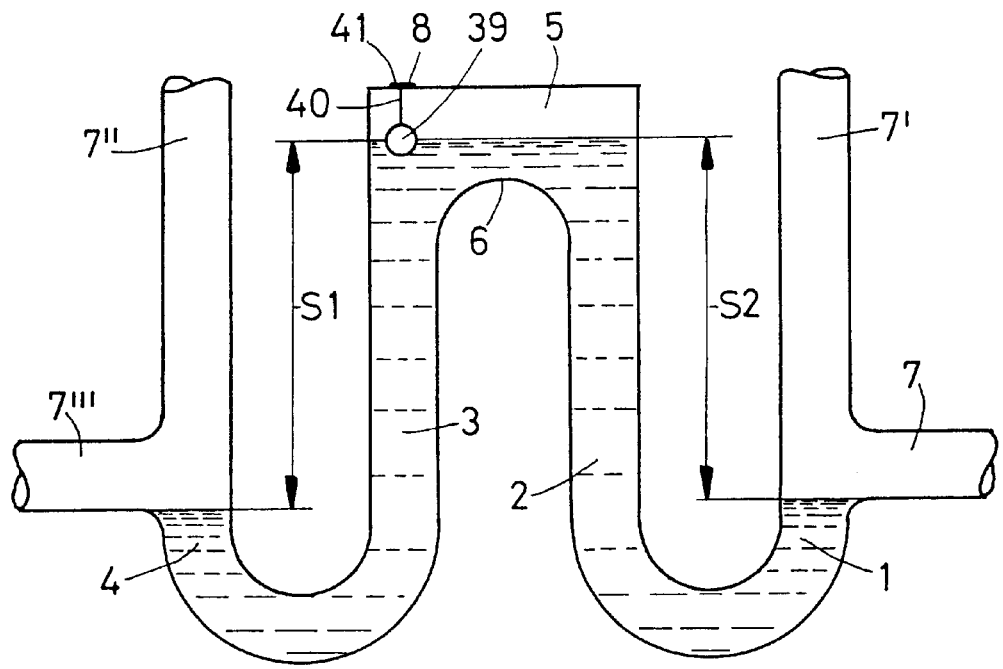
FIG. 11-I
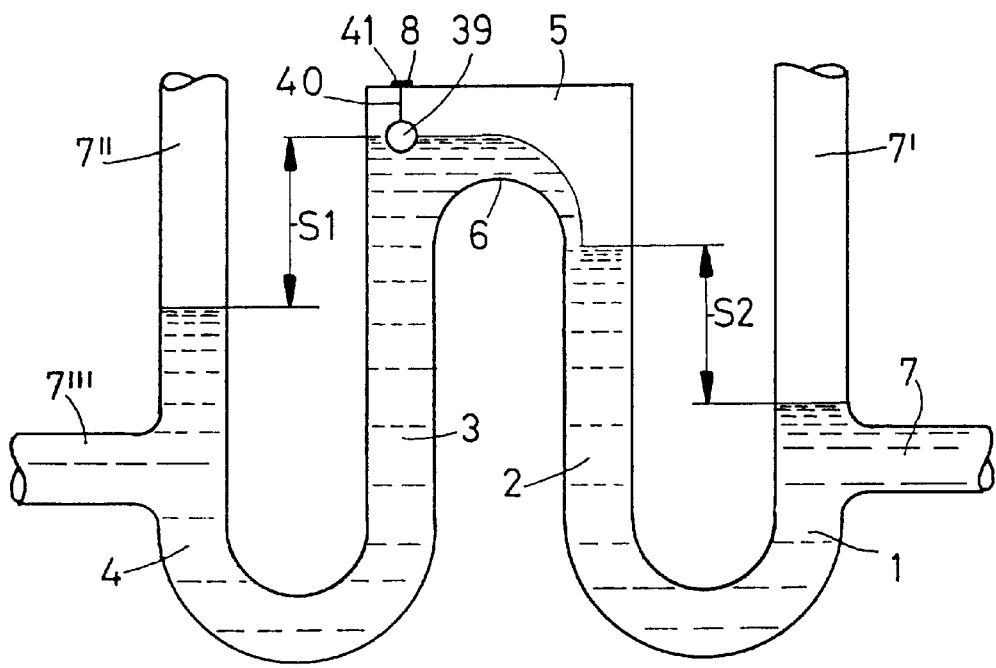
FIG. 11-II

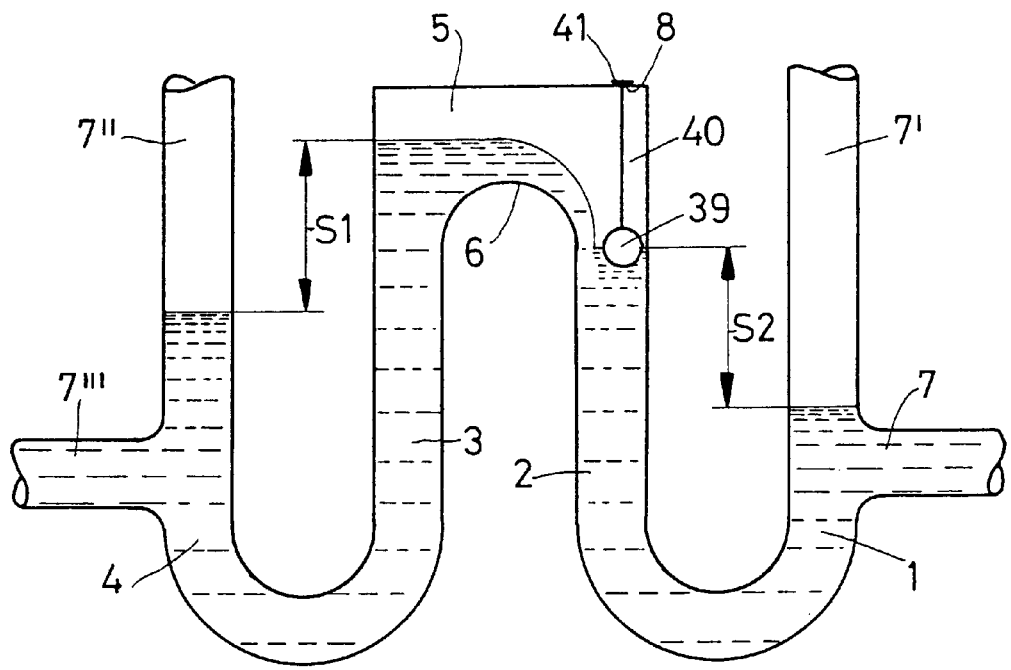
FIG.12 - I
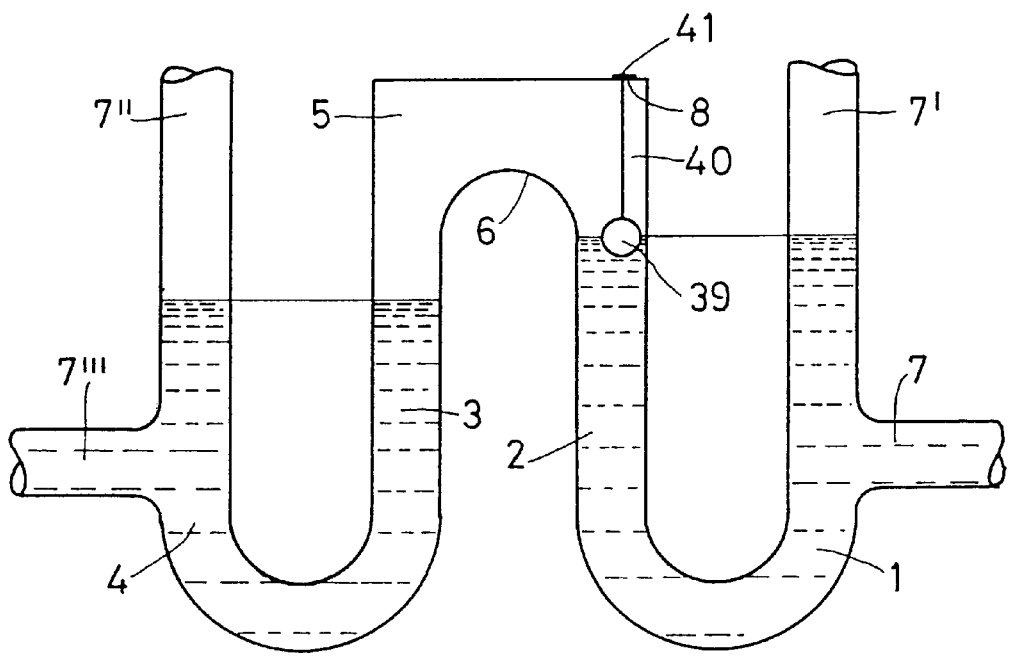
FIG.12 - II

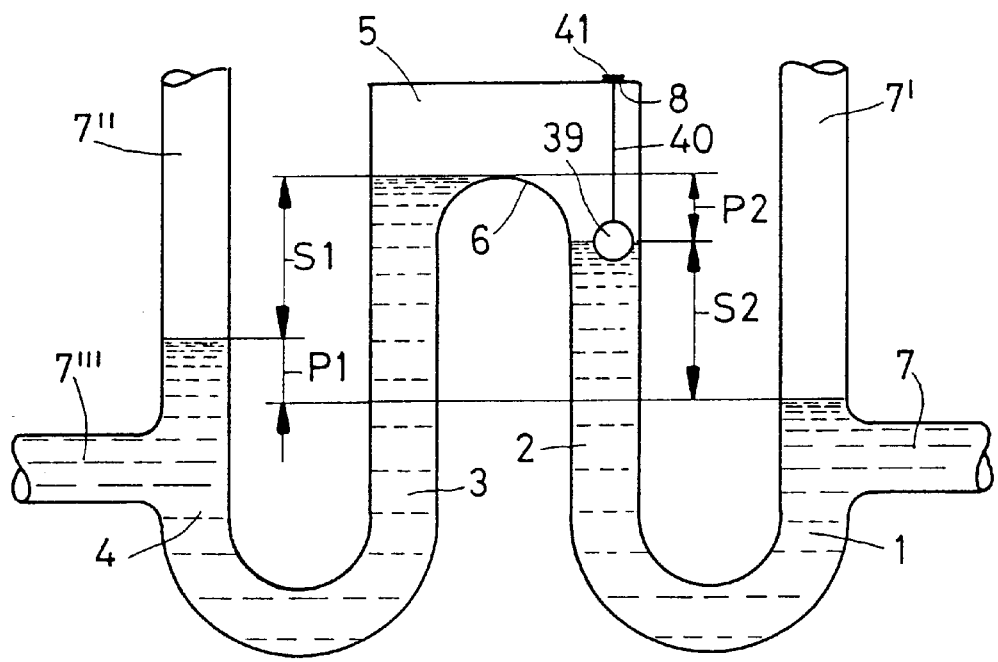
FIG. 13 - I
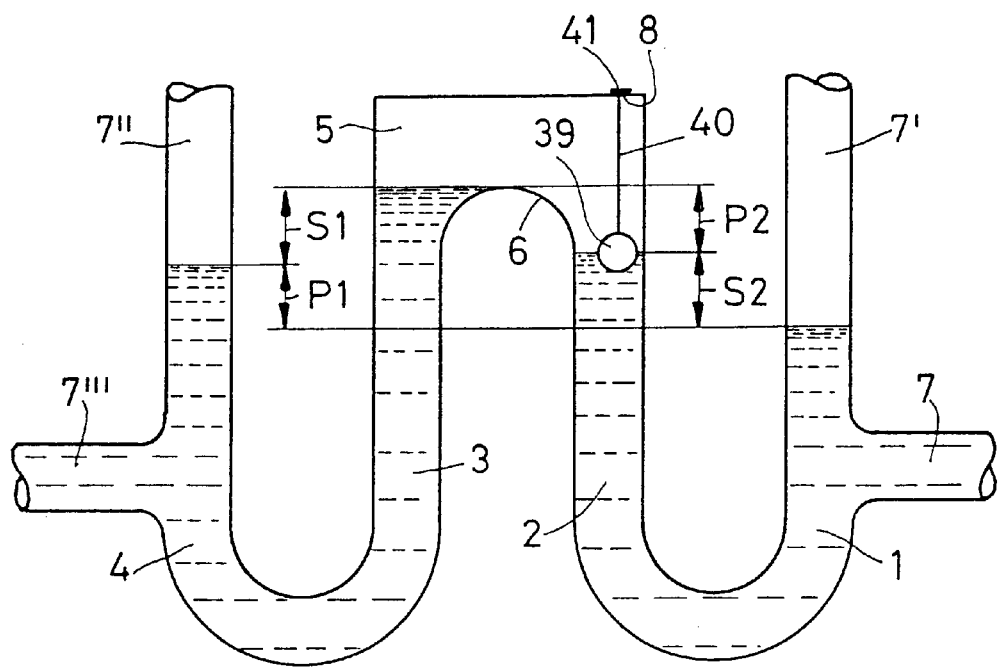
FIG. 13 - II

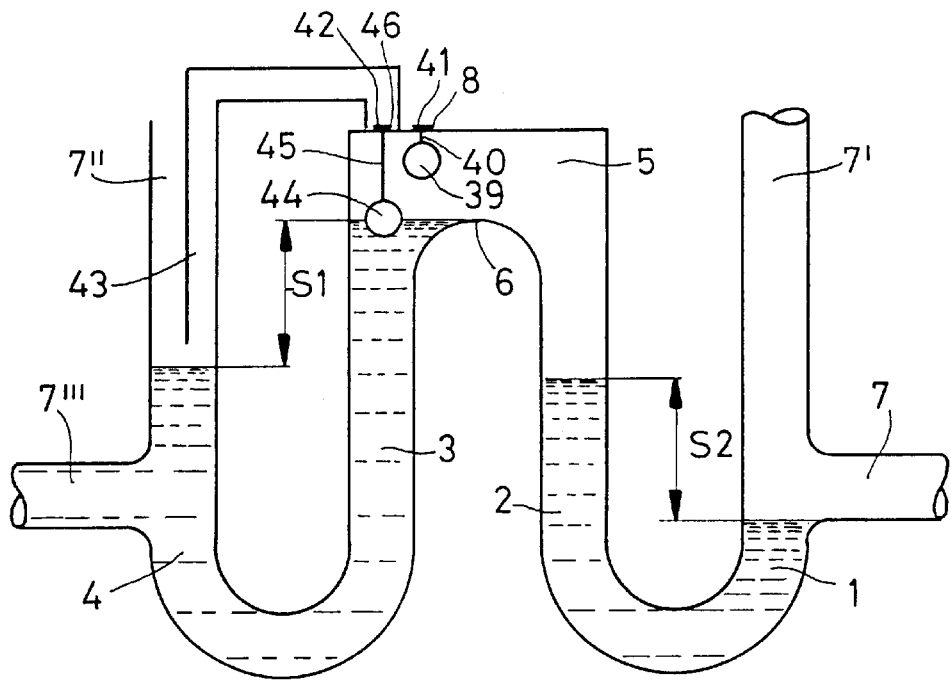
FIG. 14 - I
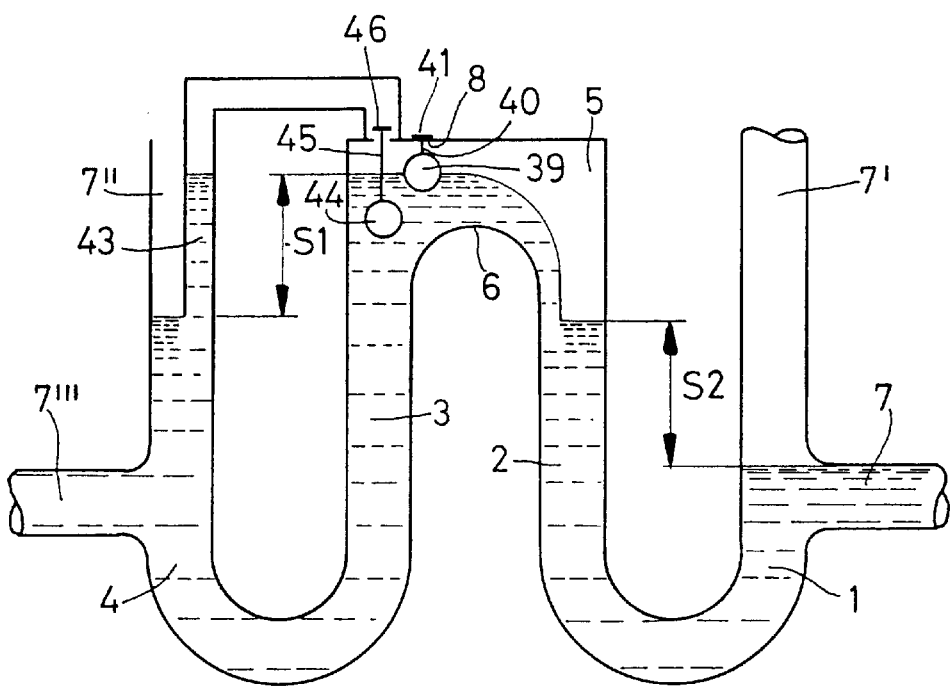
FIG. 14 - II

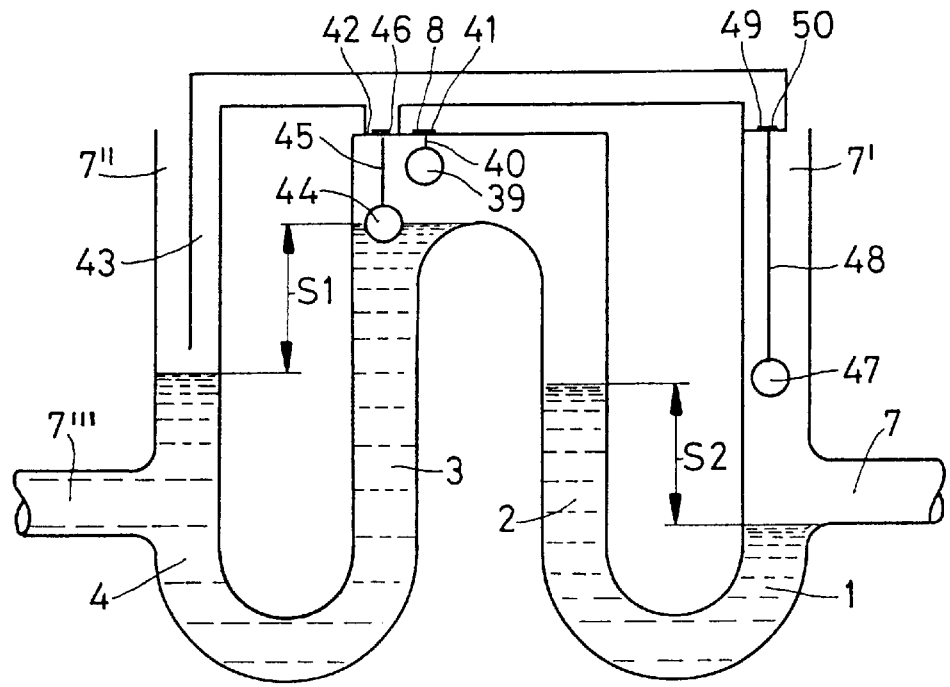
FIG. 15-I
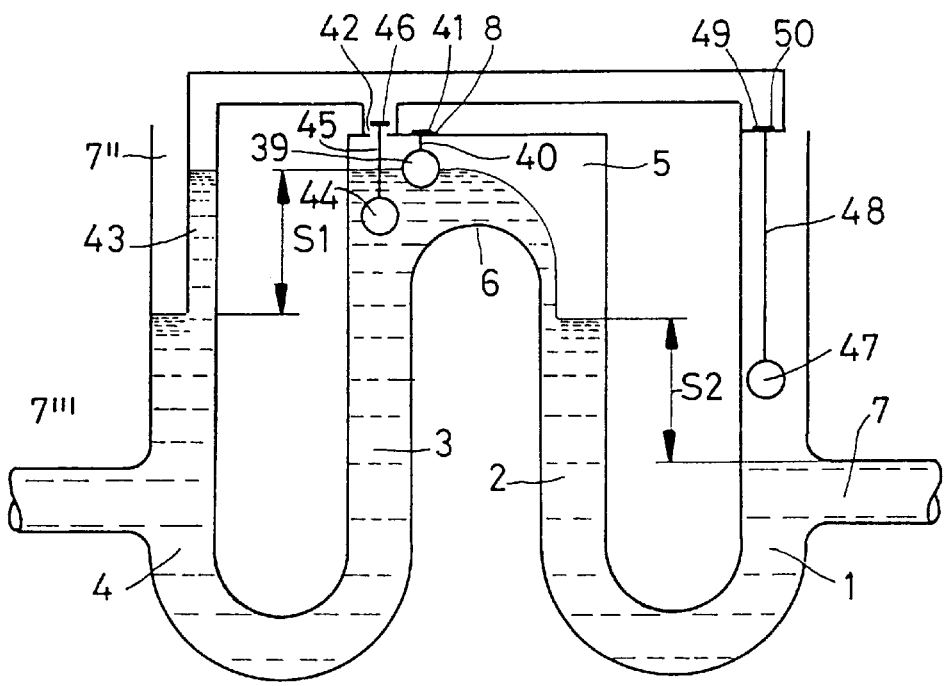
FIG. 15-II

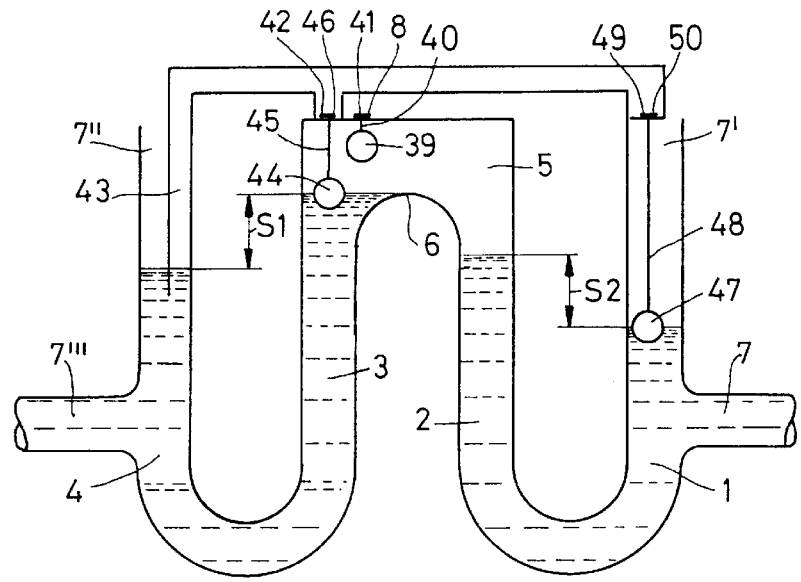
FIG.15-III
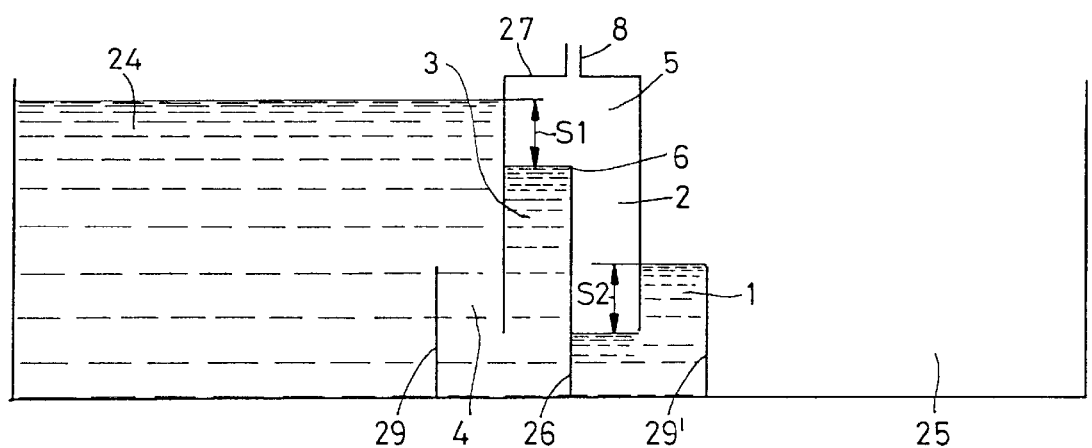
FIG.16

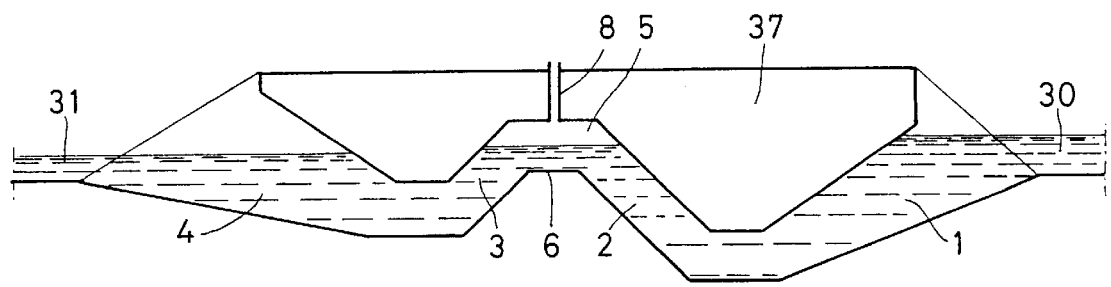
FIG. 18-I
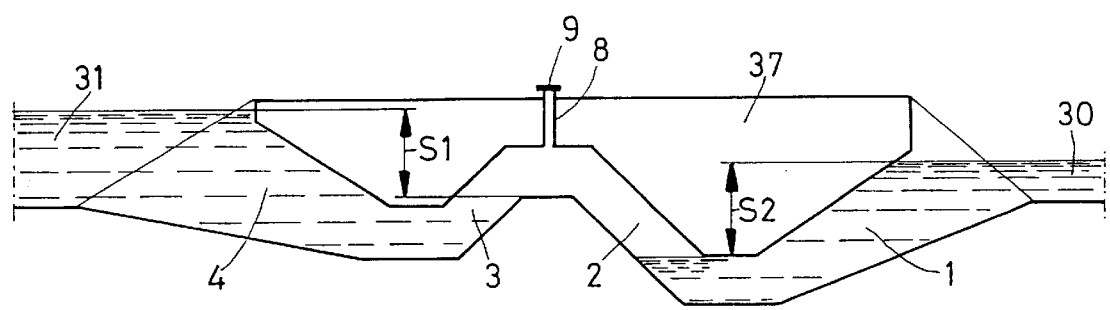
FIG. 18-II
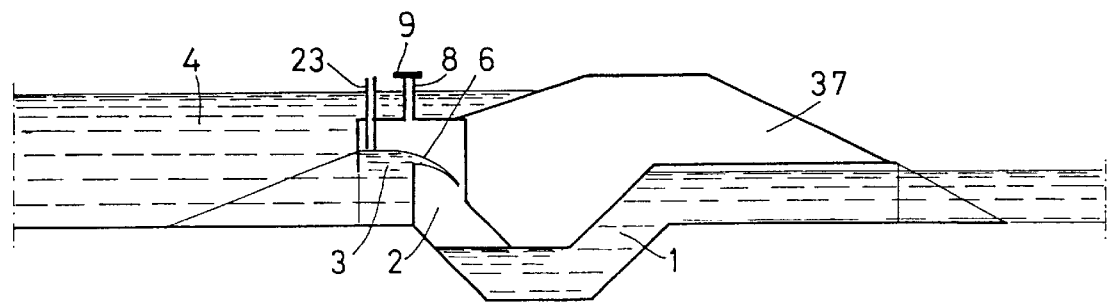
FIG. 19

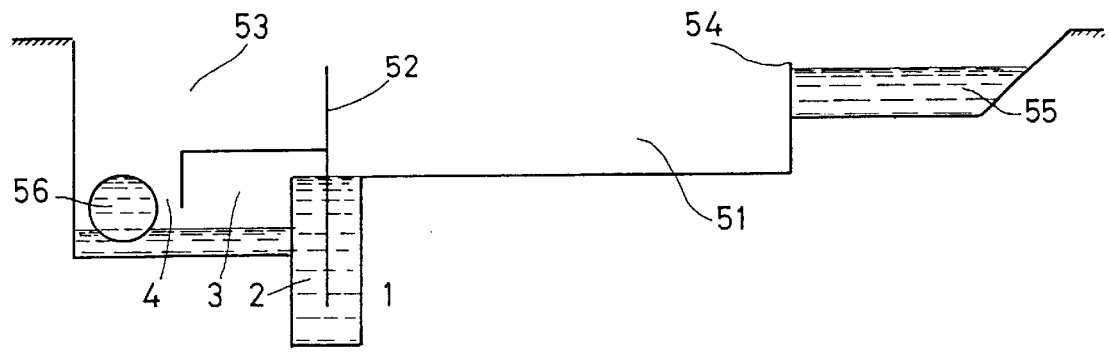
FIG. 20-I
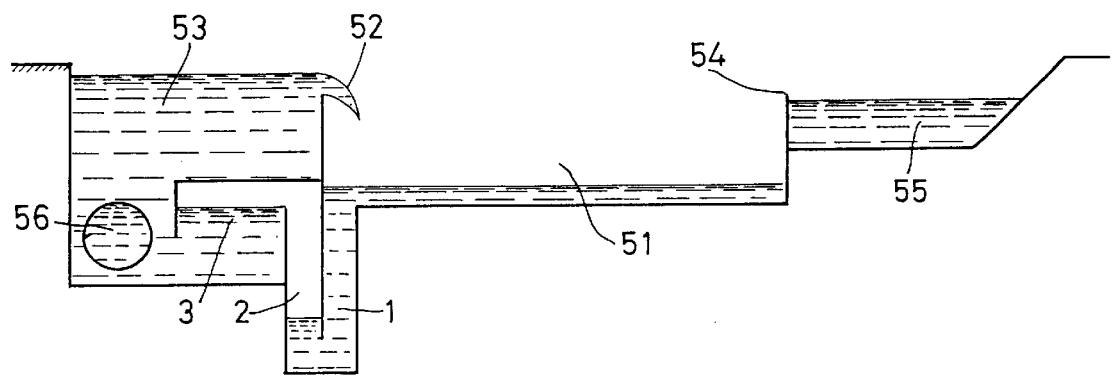
FIG. 20-II
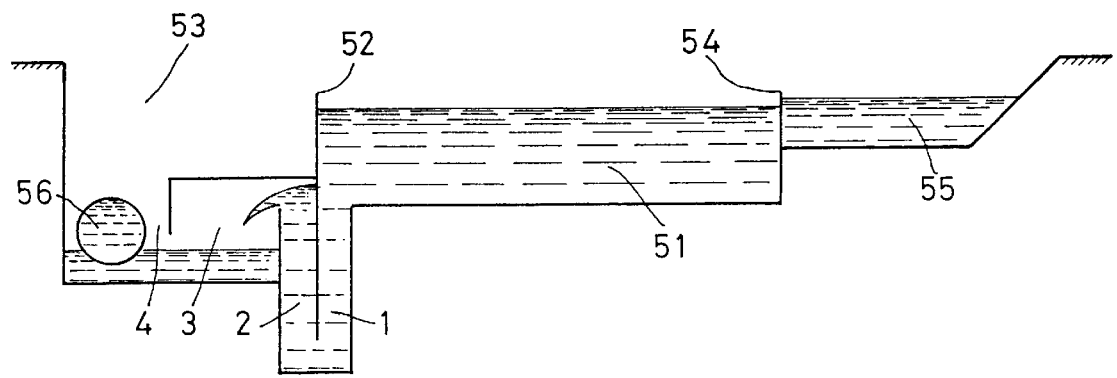
FIG. 20-III

DEVICE FOR CONTROLLING A LIQUID FLOW

This is a continuation of application Ser. No. 09/355,988 filed Aug. 24, 1999 which in turn is a continuing application of the national phase under 35 USC §371 of PCT International Application No. PCT/NL98/00106 which has an International Filing Date of Feb. 23, 1998, which designated the United States of America and was published in English.

The invention relates to a device for controlling a liquid flow.

The invention furthermore relates to a gas pressure delivery system for use in a device according to the invention.

Usually a mechanical device, such as a valve, a stop valve, a flow controller or a level controller is used for controlling a liquid flow.

One drawback of the use of such a mechanical device is that in the long run it will not operate properly anymore, due to the deposition of dirt or due to corrosion. Deposited dirt will prevent a valve from shutting off properly, and a flow controller will regulate a flow other than the desired flow. Corrosion may cause pivots to get stuck or packings to become rust-bound, as a result of which the valves in which said pivots or packings are present will no longer operate properly. Also wear may prevent mechanical devices from operating properly. Mechanical devices are liable to malfunction, therefore, and require a great deal of maintenance. This is problematic in particular when said devices form part of systems which are not easily accessible, such as sewage systems or pipes under dikes. In those cases repairs are often difficult to carry out, are time-consuming and costly. Furthermore, mechanical devices are expensive. Especially large devices, such as weirs, which up to now required large and heavy movable liquid-retaining constructions, which necessitated the use of heavy-duty control elements are expensive.

One object of the invention is to provide a device for controlling a liquid flow which requires very little maintenance, which is reliable and easy to operate, and which is preferably inexpensive.

The device according to the invention is characterized in that the device is configured such that a liquid flow being passed through the device during operation can be controlled by means of a gas pressure.

Hardly any moving part is required, if at all, because a gas pressure is used for controlling the liquid flow, as a result of which the device requires little maintenance and is not very liable to malfunction.

The invention is based on the insight that a gas is capable of displacing a liquid. The through-flow can be increased, reduced or stopped by locally introducing or discharging a gas into or from a predetermined part of a liquid pipe.

One embodiment of the device according to the invention comprises a bent pipe portion. Said pipe portion is preferably disposed in the device in such a manner that the bend in said pipe portion is positioned higher than the rest. Thus there is a higher portion, in which a gas may be present. Gas is lighter than liquid, and will thus rise in liquid. An atmospheric pressure, an underpressure or an overpressure may prevail in said bend. The ends of the pipe portion may be disposed in different reservoirs, for example, enabling to control a liquid flow between said reservoirs.

Another embodiment of the device according to the invention has a pipe portion which comprises more than one bend, so that it forms a system of communicating vessels. This makes it possible to control the liquid with extra precision. This device may be suitably incorporated in a system of pipes. The length of the various parts of the system of communicating vessels may be adapted to the dimension and the vertical position of the pipes of the system in which the device is incorporated, as a result of which the desired shutting-off action and flow control can take place with extra precision. This embodiment of the device according to the invention can be realised in several manners. Most of said manners will result in a device which is not dependent on energy being supplied.

Another embodiment of the device according to the invention comprises a bent pipe portion, which comprises a wall in which an opening is present, through which opening a gas can be introduced or carried off. This provision enables an even better control of the liquid flow. The gas pressure that is applied can be adapted to the dimensions and the location of the pipes of the system in which the device is incorporated.

The gas pressure is preferably delivered by means of a gas pressure delivery system which is controlled by means of a liquid flow. In that case the system will comprise few moving parts, as a result of which the system requires little maintenance and is not very liable to malfunction and is practically independent of the supply of energy. The gas pressure delivery system may for example comprise a container which is in open communication on one side with a liquid reservoir (which may also form part of a pipe) in which the level of liquid can be varied. In such a manner a pressure can be generated. The container contains gas during operation and, as already said before, it is in open communication with a liquid reservoir and, on the side where no liquid is present, with a pipe whose diameter is much smaller than that of the container. When the level of the liquid in the liquid reservoir rises, gas will be carried off through the pipe. As a result of the difference in diameter between the container and the pipe, a relatively small rise of the liquid level will result in a large amount of gas being carried off. The advantage of such a system is that it is simple to install. The flow through the pipe determines the gas pressure that is generated.

In another embodiment of said gas pressure delivery system the container is shut off from the pipe by means of one or more spring-suspended plates. This has the advantage that no liquid can find its way into the gas pipe.

In another embodiment two plates are present, one plate having a larger area than the other, which plates are interconnected. Preferably said plates are rigidly interconnected. One advantage of this embodiment is the fact that a relatively small pressure on the larger plate is capable of compensating a relatively large pressure on the smaller plate. This makes it possible to generate a large gas pressure by means of a small increase of the flow through the pipe.

According to another embodiment of the device according to the invention the gas pressure is delivered by a compressor. The advantage of this is that thus practically any gas pressure that is desired can be delivered in a simple manner.

According to another embodiment of the device according to the invention a float system is used for opening and closing openings for the supply and discharge of gas. A float is an object which is capable of floating on a liquid surface. In one embodiment of the device according to the invention a float thus floats on the surface of the liquid whose level or flow is to be controlled during operation. The float is connected to a valve, which is capable of opening or closing an opening through which a gas can be supplied or discharged. The liquid level determines whether the opening will be open or closed. The liquid level is influenced by supplying or discharging gas. In this manner it is possible to control the liquid level or the liquid flow. The device may comprise more than one float, with each float controlling a separate opening. The opening or closing of the various openings serves different purposes.

The device according to the invention can be used advantageously for controlling liquid flows in a sewage system. With this type of system there is a great risk of dirt being deposited, since the system is used for carrying off dirt. Moreover, a sewage system is very difficult to gain access to, because it is located deep under the ground surface. The device according to the invention exhibits hardly any fouling, since there is hardly any deposition of dirt, and furthermore it requires almost no maintenance. This makes the device according to the invention highly suitable for this use. The device may for example be used for protecting against backflow in a sewage system in a cellar, for limiting the flow in sewage chains, and for separating rain water into highly polluted rain water and less polluted rain water. Said rain water may be discharged separately to a foul sewer and a clean sewer respectively.

The device according to the invention can also be used advantageously for controlling a liquid flow between liquid basins, such as the water basins of a water purification plant. In an embodiment according to the invention which is highly suitable for this purpose the bent pipe portion comprises two spaces on either side of a wall. The gas pressure in the space above the wall can be varied, as a result of which it is possible to vary the amount of water that flows over the water from one space into another. The device may furthermore be configured such that a basin which is in communication with said one space can be emptied, whilst a basin which is in communication with the other space may remain full. This is usefull in particular when maintenance work must be carried out on a basin. The device according to the invention thus enables to carry out maintenance work on basins in which heavy-duty valves, which require a great deal of maintenance, are avoided.

The device according to the invention is also highly suitable for controlling liquid levels and liquid flows in hydraulic-engineering works and irrigation works. The usual engineering works, such as weirs, drainage sluices and tidal barriers comprise heavy, expensive, movable structures requiring a great deal of maintenance. The control installations of these structures are large, complex and dependent on the supply of energy. The device according to the invention does not comprise any movable structures or control installations, which enables a more reliable and inexpensive control of liquid levels and liquid flows. Furthermore it is possible, if the device is not too large, to use an automatic control system which does not depend on the supply of electric energy. An example of a hydraulic-engineering work wherein the device according to the invention can be used advantageously is an installation for controlling a liquid flow under a dyke. Pipes under dykes are not easily accessible. For that reason it is important that the installations that are used do not require a great deal of maintenance.

According to another embodiment the device is spiral-shaped. The advantage of this embodiment is that it provides a better through-flow during operation.

BRIEF DESCRIPTION OF THE DRAWINGS

The invention will be explained and elucidated hereafter with reference to the following Figures.

Similar parts are numbered alike in the various Figures.

FIGS. 1-I through 1-VIII are diagrammatic longitudinal sections of a device by means of which a liquid flow through a system of pipes can be controlled, wherein various stages of a control process are shown.

FIGS. 2-I through 2-IV are diagrammatic longitudinal sections of an embodiment of a gas pressure control system which comprises a container, which is shut off from a liquid pipe by means of a spring-suspended plate, wherein various stages of a control process are shown.

FIGS. 2A-I through 2A-IV are diagrammatic longitudinal sections of an embodiment of a gas pressure control system which comprises a container, which is shut off from a liquid pipe by means of a spring-suspended plate, wherein various stages of the control process are shown.

FIGS. 11-I through 11-II are diagrammatic longitudinal sections of an embodiment of the device according to the invention, which functions as a flow limiter, wherein various stages of a control process are shown.

FIGS. 12-I through 12-II are diagrammatic longitudinal sections of an embodiment of the device according to the invention, which functions as a backflow protection device, wherein various stages of a control process are shown.

FIGS. 13-I through 13-II are diagrammatic longitudinal sections of an embodiment of the device according to the invention, which functions a backflow protection device, and which maintains a constant difference between two liquid levels, wherein various stages of a control process are shown.

FIGS. 14-I through 14-II are diagrammatic longitudinal sections of an embodiment of the device according to the invention, which functions as a weir, wherein various stages of a control process are shown.

FIGS. 15-I through 15-III are longitudinal sections of an embodiment of the device according to the invention, which maintains the liquid surface in the outer pressure vessel at a predetermined level, provided the liquid surface in the inner pressure vessel is higher than a predetermined other level, wherein various stages of a control process are shown.

FIG. 16 is a diagrammatic vertical cross-section of two liquid basins comprising an interconnection which incorporates an embodiment of the device according to the invention.

FIGS. 18-I through 18-II are diagrammatic cross-sections of an embodiment of the device according to the invention, which is used in a pipe under a dyke, wherein various stages of a control process are shown.

FIG. 19 is a diagrammatic cross-section of an embodiment of the device according to the invention, which is used in a pipe under a dyke, and by means of which a constant flow can be maintained.

FIGS. 20-I through 20-III are diagrammatic cross-sections of an embodiment of the device according to the invention, which is incorporated between a sewage drain and a buffer settling basin, wherein various stages of a control process are shown.

DETAILED DESCRIPTION OF THE PREFERRED EMBODIMENT

Figure 3:
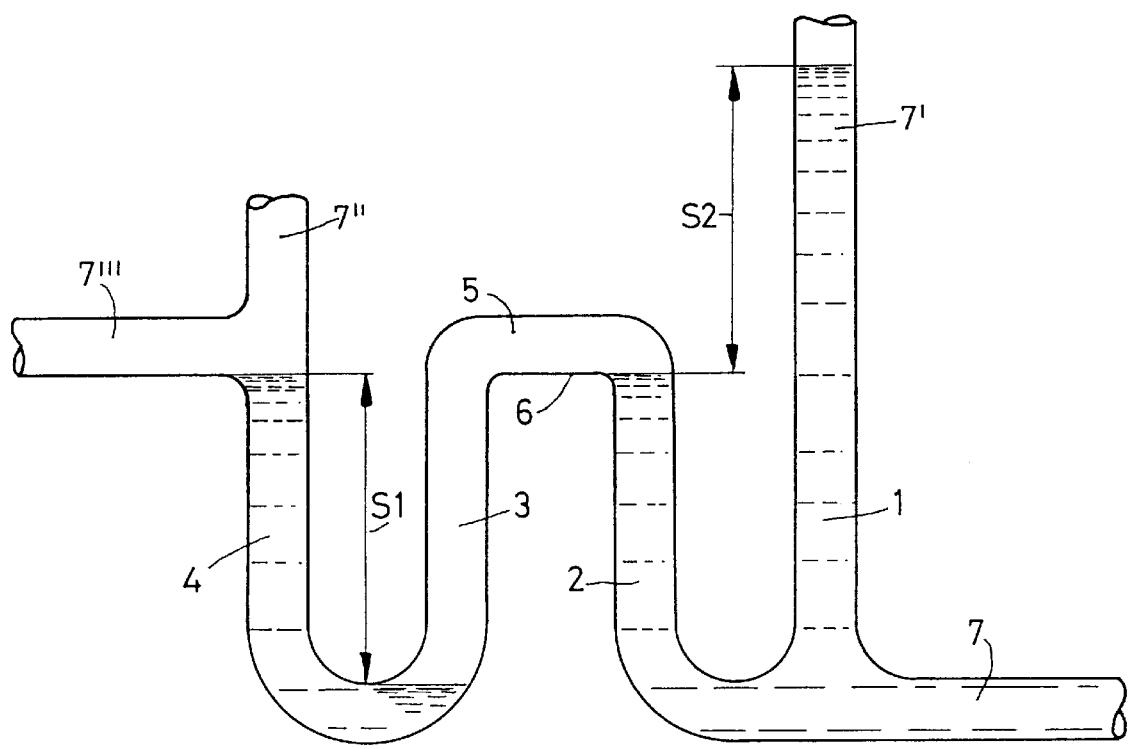
FIG. 3 is a diagrammatic longitudinal section of an embodiment of the device according to the invention, which functions as a valve.

FIG. 1 is a diagrammatic longitudinal section of an embodiment of a device by means of which a liquid flow through a system of pipes can be controlled, wherein eight different stages of a control process are shown. In this case the device forms a system of communicating vessels. FIGS. I, II, III, IV, V, VII, VIII show different situations herein a liquid is present in the device.

The device comprises an outer pressure vessel (1), an inner pressure vessel (2), an inner back pressure vessel (3), an outer back pressure vessel (4), and a pressure chamber (5). In this embodiment said pressure vessels (1, 2, 3 and 4) have the same dimensions and shape. They may also have different dimensions, depending on their use. The shape of the pressure chamber (5) may differ from that which is shown. A flow threshold (6) is present in the pressure chamber, and in this embodiment the wall of the pressure chamber has a closable opening (8) provided therein, through which a gas can be supplied or discharged, or which can be closed, so that the pressure chamber (5) will be shut off from the atmosphere. This embodiment of the device comprises inlets (7, 7∩, 7∩∩ and 7∩∩∩) which are in communication with the atmosphere in this figure. It is also possible for an inlet not to be in communication with the atmosphere. In that case the liquid levels will not be as shown in this figure. It depends on the particular use which type of connection is used. A liquid can flow into or out of the device through the inlets. A valve (9) may be present for shutting off the pressure chamber from the atmosphere.

The pressure chamber (5) may be in communication with the atmosphere, or it may be shut off therefrom. If the pressure chamber is not in communication with the atmosphere, the pressure in the pressure chamber may differ from the atmospheric pressure. The liquid level and/or the liquid flow may differ as the pressure in the pressure chamber differs.

In Subfigure I the pressure chamber is shown to be in communication with the atmosphere, and the liquid levels in the outer pressure vessel (1), the inner pressure vessel (2), the inner back pressure vessel (3) and the outer back pressure vessel (4) are the same. In Subfigures II–VIII the pressure chamber is shown to be shut off from the atmosphere. In Subfigure II the pressure in the pressure vessel is the same as the atmospheric pressure. In Subfigure VI the pressure in the pressure vessel is lower than the atmospheric pressure. As a result of the presence of the underpressure in the pressure vessel, the liquid level in the inner pressure vessel and the inner back pressure vessel is higher than in the outer pressure vessel and the outer back pressure vessel. The underpressure is still not high enough for effecting a liquid flow or causing liquid to flow over the liquid threshold. In Subfigure III the pressure in the pressure vessel is higher than the atmospheric pressure. As is shown in said figure, no liquid is present in the pressure chamber. The liquid does not flow through in this situation. The difference in level (S2) between the liquid in the outer pressure vessel (1) and that in the inner pressure vessel (2) is the same as the difference in level(S1) between the liquid in the inner back pressure vessel (3) and that in the outer back pressure vessel (4). This difference in level depends on the difference between the pressure in the pressure chamber and the atmospheric pressure. In Subfigure IV the device is shown to be in liquid contact with the inlet (7). The difference in level (S2) between the liquid in the outer pressure vessel (1) and that in the inner pressure vessel (2) is the same as the difference in level(S1) between the liquid in the inner back pressure vessel (3) and that in the outer back pressure vessel (4). In the inner pressure vessel the liquid is on a level with the flow threshold. The pressure in the pressure chamber (an overpressure in this case) is so much higher than the atmospheric pressure, that the liquid does not flow through. A through-flow can be enabled by adjusting a lower overpressure in the pressure chamber. This situation is shown in Subfigure V. The through-flow can be controlled by means of the pressure in the pressure chamber, therefore. It is also possible to measure the level of the liquid in the pressure chamber and to adjust the pressure on the basis of said measurement. In this manner it is possible to control the flow rate, that is, the amount of liquid that flows over the threshold per time unit. FIGS. VI, VII and VII show the situation in which at least two inlets are located at a level lower than the pressure chamber (5). FIG. VI shows the situation in which an underpressure prevails in the pressure chamber, and no liquid is being introduced into the inlets (7, 7∩∩∩). From the fact that S1 and S2 are of the same magnitude it appears that the system is in a state of equilibrium. FIG. VII shows the situation in which the level of the liquid in one of the inlets (7) is higher than in the other inlet (7∩∩∩). FIG. VIII shows the situation in which the gas pressure in the gas chamber (5) is so high that liquid can just flow over the liquid threshold.

FIG. 2 is a diagrammatic longitudinal section of an embodiment of a gas pressure control system which comprises a container (10), which is shut off from a liquid reservoir (11) by means of a spring-suspended plate (15), wherein various stages of a control process are shown. The spring-suspended plate is rigidly connected to a closing plate (14). When the liquid in the liquid reservoir (11) is being adjusted to the correct level, the plate (15) will be moved upwards. In Subfigures I and II the pressure system is built up in such a manner that when the level of the liquid in the liquid reservoir (11) is raised to a sufficient extent, the closing plate (14) will be pressed against opening (33), as a result of which said opening will be closed. Subfigure I shows a control process situation in which the opening (33) is not closed. Subfigure II shows a control process situation in which the opening (33) is closed. In Subfigure III and IV the pressure system is built up in such a manner that the opening (33) will be open when the level of the liquid in the liquid reservoir (11) is higher than the level at which the opening (33) is closed. Subfigure II shows the opening (33) to be open. In Subfigure IV the level of the liquid in the liquid reservoir (11) is so low, that the opening (33) is closed. If there is a gas flow through the inlet pipe (13), via the container (10), to the connecting pipe (12), said gas flow will be stopped by the closing of the opening (33). Since the spring-suspended plate (15) has a larger surface area than the closing plate, it is possible to compensate a relatively large pressure in the container (10) with a relatively small pressure in the reservoir (11). If the liquid reservoir (11) is for example under atmospheric pressure, the valve will be capable of baffling pressures higher than atmospheric pressure in the container (10). In Subfigures I and III the opening (33) is open, and gas flows through the pipes (12, 13) and through the container (10) in the direction indicated by the arrows. In Subfigure II the opening (33) is closed and there is no flow through the pipes (12, 13) and through the container (10). The liquid reservoir (11) may be in communication with pipes through which liquid can be supplied or discharged. Furthermore it is possible for the reservoir itself to form part of a pipe.

FIG. 2A is a diagrammatic longitudinal section of an embodiment of a gas pressure control system comprising a container (10), which is shut off from a liquid reservoir (11) by means of a spring-suspended plate (15), wherein various stages of a control process are shown. The spring-suspended plate is rigidly connected to two closing plates (14). When the liquid in the liquid reservoir (11) is raised to the correct level, this will cause the plate (15) to move upwards. In Subfigures I and II the pressure system is built up in such a manner that when the liquid level in the liquid reservoir (11) rises sufficiently, the closing plates (14) will become detached from the openings (33), as a result of which said openings will be opened. Subfigure I shows a control process situation in which the openings (33) are not closed. Subfigure II shows a control process situation in which the openings (33) are closed. In Subfigures III and IV the pressure system is built up in such a manner that the openings (33) will be closed when the liquid level in the liquid reservoir (11) is higher than the level at which the openings (33) are open. In Subfigure III the openings (33) are open. In Subfigure IV the liquid level in the liquid reservoir is so high that the openings (33) are closed. If there is a gas flow through the inlet pipe (13), via the pressure container (10), to the connecting pipe (12), said gas flow will be stopped by the closing of the opening (33). As a result of the use of the two closing plates (14), which are interconnected, the force which is required for moving said closing plates (14) will not depend on the prevailing pressure in the connecting pipe (12) or in the inlet pipe (13). The forces which are exerted on the closing plates (14) by a gas pressure will offset one another. The provision of an adjusting screw and a spring between the container (10) and the closing plates (14) enables precise adjustment of the pressure on the spring-suspended plate (15) which is required for opening or closing the openings (33), and thus also of the liquid level. The liquid reservoir (11) may be in communication with pipes through which liquid can be supplied or discharged. Furthermore the reservoir itself may form part of a pipe.

FIG. 3 is a diagrammatic longitudinal section of an embodiment of the device according to the invention, which functions as a valve. The device comprises an outer pressure vessel (1), an inner pressure vessel (2), an inner back pressure vessel (3), an outer back pressure vessel (4), and a pressure chamber (5). The pressure chamber (5) comprises a flow threshold (6). The device comprises inlets (7, ∩, ∩∩, 7∩∩∩). Liquid can flow into or out of the device via said inlets. Usually the liquid flows from the side of inlets ∩∩ and 7∩∩∩ in the direction of inlets 7 and 7∩. In that case the pressure chamber will be in open communication with the atmosphere via the inner pressure vessel (2) and the outer pressure vessel (1). If the liquid level in the outer pressure vessel (1) rises, the liquid level in the inner pressure vessel (2) will rise as well. As a result of this rise, the gas present in the inner pressure vessel (2) will be carried to the pressure chamber. This will cause the pressure in the pressure chamber (5) to rise, so that liquid level in the outer pressure vessel (1) may be higher than the level of the flow threshold (6). Consequently there will be no through-flow. This situation is shown in FIG. 3. By enlarging the through-flow opening of the inner pressure vessel (2) and reducing the height, the difference in level between inlets 7∩∩∩ and 7 can be reduced considerably, whilst the operation will remain exactly the same.

Figure 4:
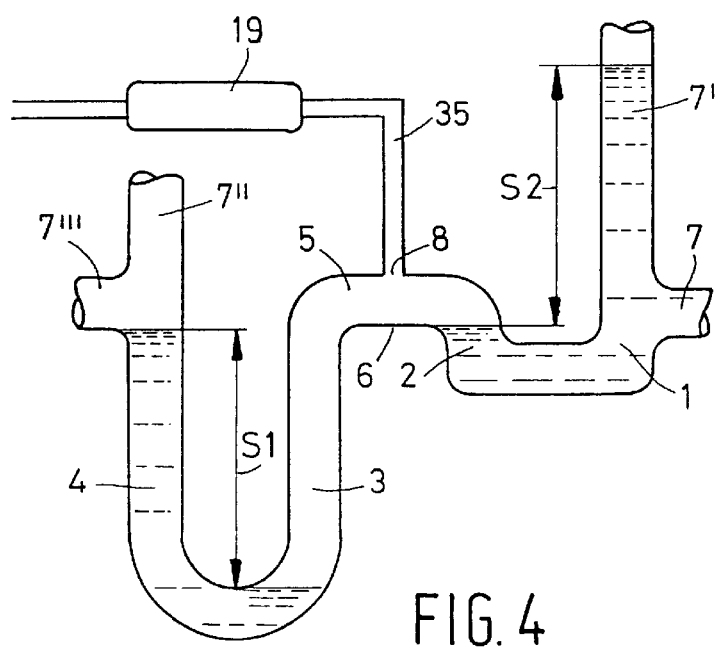
FIG. 4 is a diagrammatic longitudinal section of an embodiment of the device according to the invention, which functions as a valve.

FIG. 4 is a diagrammatic longitudinal section of an embodiment of the device according to the invention, which functions as a valve. The device comprises an outer pressure vessel (1), an inner pressure vessel (2), an inner back pressure vessel (3), an outer back pressure vessel (4), and a pressure chamber (5). The pressure chamber (5) comprises a flow threshold (6) and an opening (8), which opening is connected to a pipe (35), which is in communication with a compressor plant (19). The device comprises inlets (7, 7∩, 7∩∩, 7∩∩∩). Liquid can flow into or out of the device via said inlets. In this embodiment the compressor plant (19) provides a continuous gas flow to the pressure chamber (5). The excess gas is carried outside via one or more outlets, for example the illustrated inlets (7∩∩, 7∩∩∩). In that case the compressor (19) can function without using costly control equipment and sensors. If no through-flow is desired, a pressure will be built up in the pressure chamber (5) by the compressor, which pressure is so high that no liquid will flow over the liquid threshold (6). Usually the liquid flows from the side of inlets 7∩∩ and 7∩∩∩ in the direction of inlets 7 and 7∩∩. By keeping the pressure in the pressure chamber (5) high, the occurrence of a backflow will be prevented. In the figure the liquid system is in a state of equilibrium. The liquid levels S1 and S2 are the same.

Figure 5:
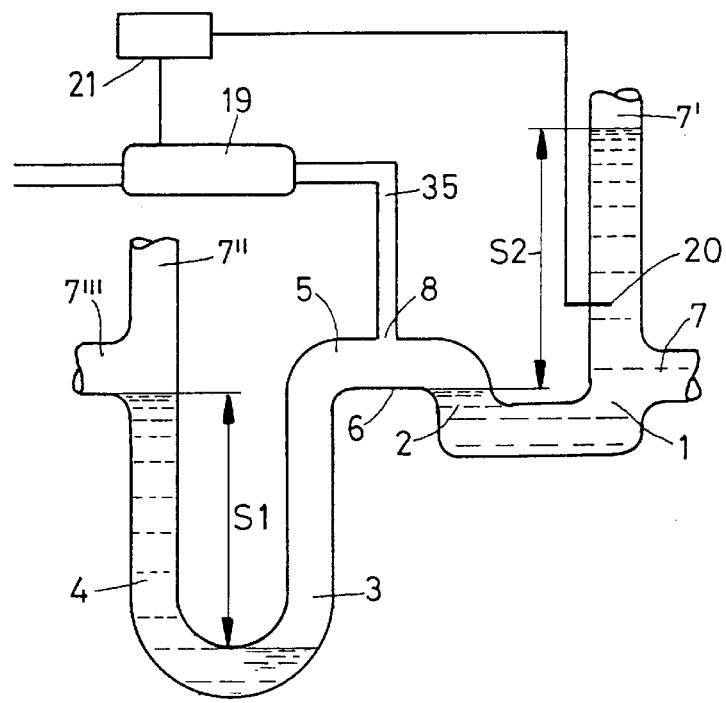
FIG. 5 is a diagrammatic longitudinal section of an embodiment of the device according to the invention, which functions as a valve.

FIG. 5 is a diagrammatic longitudinal section of an embodiment of the device according to the invention, which functions as a valve. The device comprises an outer pressure vessel (1), an inner pressure vessel (2), an inner back pressure vessel (3), an outer back pressure vessel (4), and a pressure chamber (5). The pressure chamber (5) comprises a flow threshold (6) and an opening (8), which opening is connected to a pipe (35), which is in communication with a compressor (19). The device furthermore comprises a sensor (20) and control equipment (21). The device comprises inlets (7, 7∩, 7∩∩, 7∩∩∩). Liquid can flow into or out of the device via said inlets. The compressor plant is used for supplying and discharging gas. In this embodiment gas is only supplied to the pressure chamber if this is necessary. Sensors and control equipment are required, therefore. If no through-flow is desired, a pressure will be built up in the pressure chamber (5) by the compressor, which pressure is so high that no liquid will flow over the liquid threshold (6). The liquid level is determined by means of a sensor (20). This embodiment may be used as a non-return valve, for example. As soon as there is a possibility of liquid flowing back, the compressor will come into operation. The Figure shows the liquid system to be in a state of equilibrium. The liquid levels S1 and S2 are the same.

Figure 6:
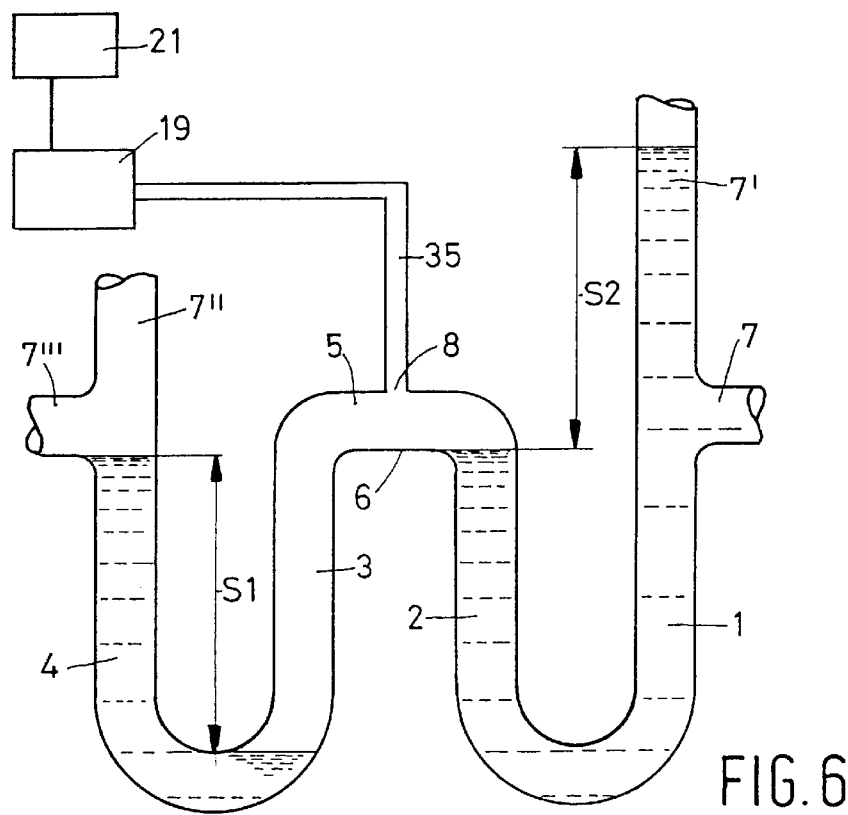
FIG. 6 is a diagrammatic longitudinal section of an embodiment of the device according to the invention, which functions as a stop valve.

FIG. 6 is a diagrammatic longitudinal section of an embodiment of the device according to the invention, which functions as a stop valve. The device comprises an outer pressure vessel (1), an inner pressure vessel (2), an inner back pressure vessel (3), an outer back pressure vessel (4), and a pressure chamber (5). The pressure chamber (5) comprises a flow threshold (6) and an opening (8), which opening is connected to a pipe (35), which is in communication with a compressor plant (19). The device comprises inlets (7, 7∩, 7∩∩, 7∩∩∩). Liquid can flow into or out of the device via said inlets. The compressor plant is used for supplying and discharging gas. In this embodiment the compressor is turned on and off during operation, as desired. The figure shows the liquid system to be in a state of equilibrium. The liquid levels S1 and S2 are the same.

Figure 7:
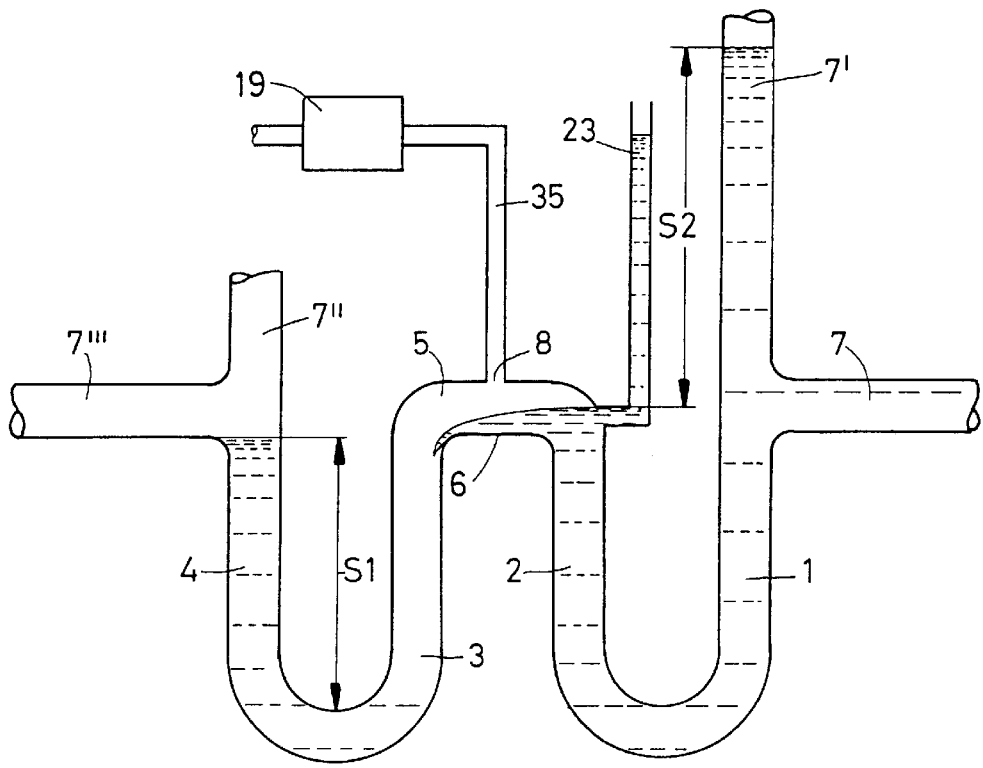
FIG. 7 is a diagrammatic longitudinal section of an embodiment of the device according to the invention, which functions as a controller.

FIG. 7 is a diagrammatic longitudinal section of an embodiment of the device according to the invention, which functions as a controller. The device comprises an outer pressure vessel (1), an inner pressure vessel (2), an inner back pressure vessel (3), an outer back pressure vessel (4), and a pressure chamber (5). The pressure chamber (5) comprises a flow threshold (6) and an opening (8), which opening is connected to a pipe (35), which is in communication with a compressor plant (19). The device comprises inlets (7, 7∩, 7∩∩, 7∩∩∩) and a breather tube (23). Liquid can flow into or out of the device via said inlets. Gas may be supplied by means of a venturi tube in the inlet (7). The advantage of this is that no energized control system is required. The gas may also be supplied by means of a compressor (19), however. Said compressor can be readily used, without any control installations being required. The water falls down in the inner back pressure vessel (3). Excess gas is discharged via a breather tube (23). In this figure S1 is smaller than S2. After all, there is no state of equilibrium. Liquid flows over the flow threshold (6). The breather tube (23) will only exhaust air if the liquid level in the pressure chamber (5) falls to a level below the bottom side of the breather tube (23). If gas is discharged from the pressure chamber (5), the pressure in the pressure chamber will decrease, and, as a result of this, the liquid level in the pressure chamber (5) will rise again. As a result of this, the pressure chamber will no longer be in open communication with the atmosphere, and the pressure in the pressure chamber will increase. This will lead to a state of equilibrium, wherein the liquid level in the pressure chamber will remain at a constant level, independently of the liquid level in the outer pressure vessel (7∩). Since this level determines the liquid flow, also the liquid flow will remain constant, therefore. The liquid flow can thus be varied by varying the level of the bottom side of the breather tube (23).

Figure 8:
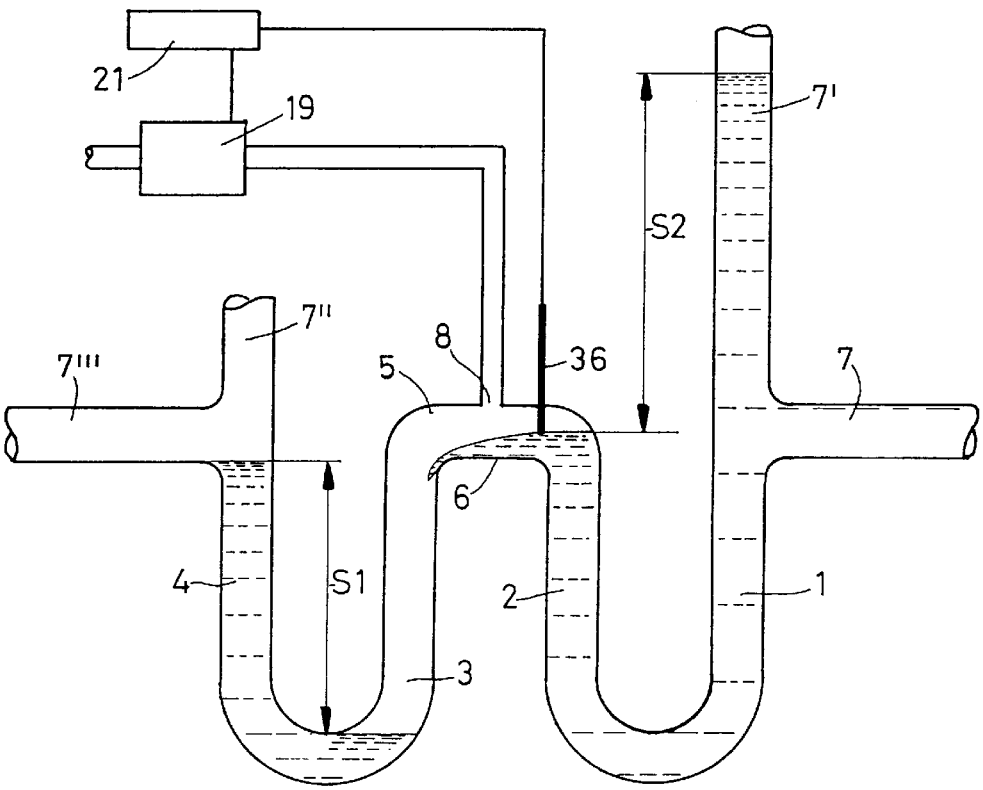
FIG. 8 is a diagrammatic longitudinal section of an embodiment of the device according to the invention, which functions as a controller.

FIG. 8 is a diagrammatic longitudinal section of an embodiment of the device according to the invention, which functions as a controller. The device comprises an outer pressure vessel (1), an inner pressure vessel (2), an inner back pressure vessel (3), an outer back pressure vessel (4), and a pressure chamber (5). The pressure chamber (5) comprises a flow threshold (6) and an opening (8), which opening is connected to a pipe (35), which is in communication with a compressor plant (19). The device comprises inlets (7, 7∩, 7∩∩, 7∩∩∩) and a sensor (36). Liquid can flow into or out of the system via said inlets. Gas can be supplied or discharged by means of the compressor plant (19). In this embodiment the flow can be controlled in a simple manner by changing the pressure that is delivered by the compressor plant (19). The compressor plant (19) will be turned on when it is established by means of the sensor (36) that the liquid level is too high. If the liquid level is too low, gas can be discharged. In this figure S1 is smaller than S2. After all, there is no state of equilibrium. Liquid flows over the flow threshold (6).

Figure 9:
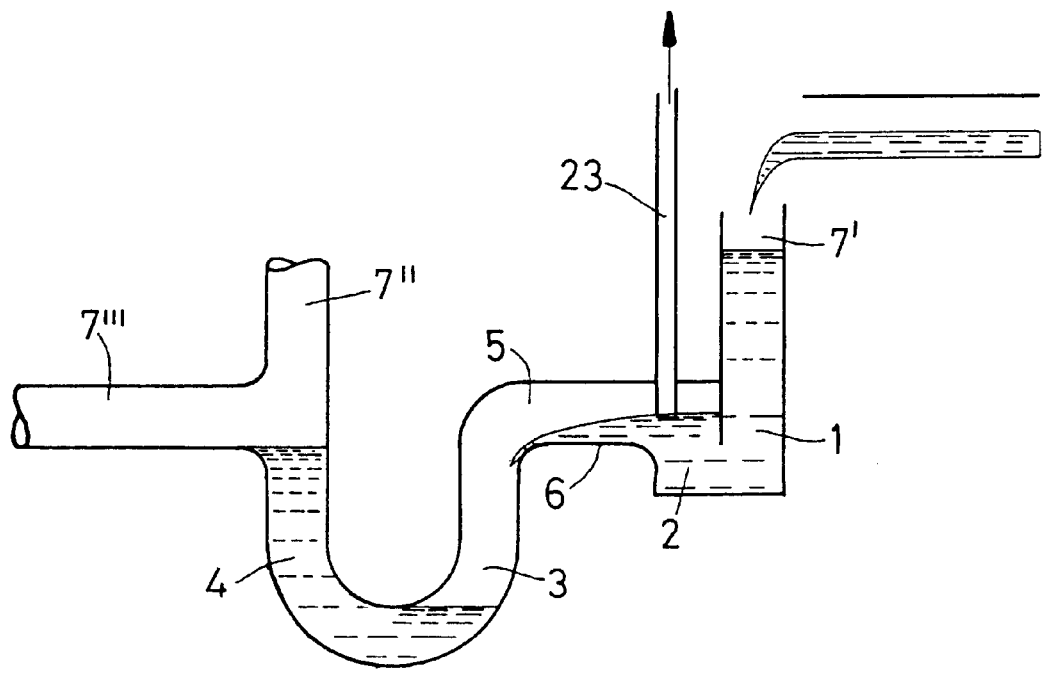
FIG. 9 is a diagrammatic longitudinal section of an embodiment of the device according to the invention, which functions as a flow controller.

FIG. 9 is a diagrammatic longitudinal section of an embodiment of the device according to the invention, which functions as a flow controller. The device comprises an outer pressure vessel (1), an inner pressure vessel (2), an inner back pressure vessel (3), an outer back pressure vessel (4), and a pressure chamber (5). The pressure chamber (5) comprises a flow threshold (6). The device comprises inlets (7∩, 7∩∩, 7∩∩∩) and a breather tuber (23). Liquid can flow into or out of the system via said inlets. Gas is supplied into the pressure chamber by the liquid flow. The liquid is poured into the outer pressure vessel (1) from a height. The resulting turbulence will introduce air bubbles into the liquid, which air bubbles are carried to the pressure chamber (5) with the flow. The breather tube (23) ensures that the liquid level above the flow threshold will be constant. If the level of the liquid above the bottom side of the breather tube (23) rises, said tube will be shut off. The excess gas cannot escape in that case, as a result of which the pressure in the pressure chamber (5) will rise. This pressure increase will cause the liquid level in the pressure chamber to fall, until it has fallen to a level below the bottom side of the breather tube. In that situation the breather tube will no longer be shut off, as a result of which gas will escape from the pressure chamber (5), the pressure will decrease and the liquid level will rise again. Thus the liquid level in the pressure chamber will remain substantially the same as the level of the bottom side of the breather tube (23). Also the flow will remain constant in this manner. The flow can be varied by varying the position of the bottom side of the breather tube (23).

Figure 10:
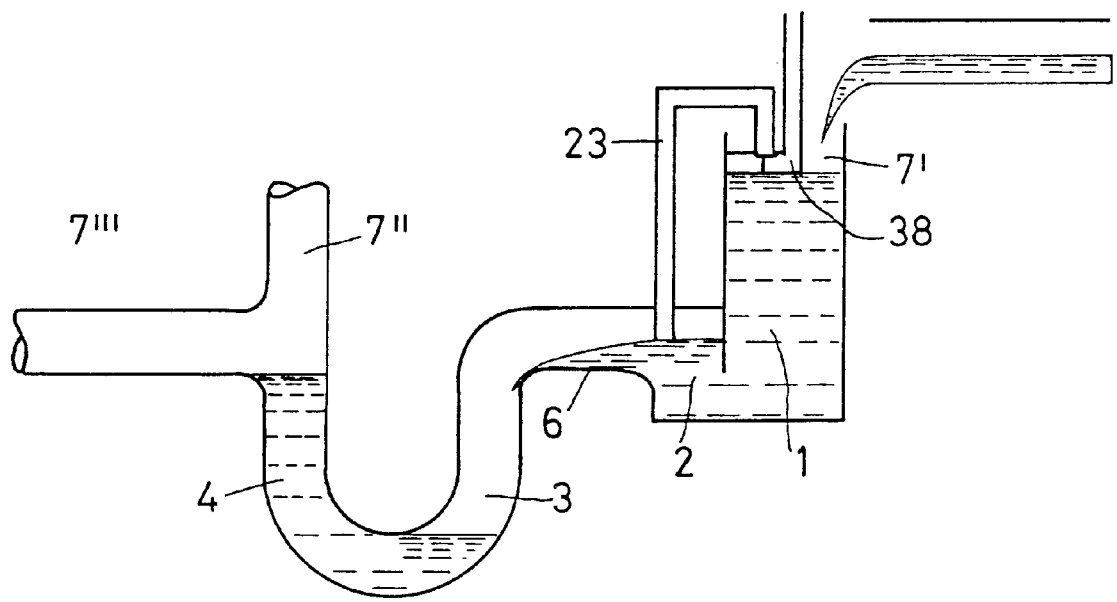
FIG. 10 is a diagrammatic longitudinal section of an embodiment of the device according to the invention, which functions as a flow controller.

FIG. 10 is a diagrammatic longitudinal section of an embodiment of the device according to the invention, which functions as a flow controller. The device functions in substantially the same manner as the device shown in FIG. 9. This embodiment comprises a valve (38) as shown in FIGS. 2.III and 2.IV, however, which valve is capable of shutting off the breather tube (23). When the liquid level in the outer pressure vessel (1) is so high that the breather tube (23) is shut off from the atmosphere, the pressure chamber (5) will also be shut off from the atmosphere. In that case the air being introduced into the pressure chamber (5) cannot escape via the breather tube (23) anymore. The pressure in the pressure chamber (5) will gradually rise. Eventually it will be so high that no liquid will flow over the liquid threshold (6) anymore. Any system wherein a valve is opened or, on the contrary, closed as soon as a particular liquid level rises above a predetermined value may be used for the float systems (39, 40 and 41) shown in FIGS. 11–15. The outer pressure vessel (1) and the outer back pressure vessel (4) shown in FIGS. 11–15 may also be any type of liquid reservoir, a lake, a pond or a river.

FIG. 11 is a diagrammatic longitudinal section of an embodiment of the device according to the invention, which functions as a flow limiter, wherein various stages of a control process are shown. Subfigures I and II show two control process situations. The device comprises an outer pressure vessel (1), an inner pressure vessel (2), an inner back pressure vessel (3), an outer back pressure vessel (4), a pressure chamber (5) and inlets (7∩, 7∩∩, 7∩∩∩). The pressure chamber (5) comprises a flow threshold (6). Liquid can flow into or out of the system through said inlets. The device also comprises a float (39), which is connected, via a rod (40), to a valve (41), which valve is capable of closing or opening an opening (8) in the pressure chamber (5), in which manner the pressure in the pressure chamber (5) can be controlled. The device ensures that the flow is limited to a predetermined value within predetermined limits of the level of liquid. An underpressure is maintained in the pressure chamber (5). Said underpressure must be realised at least once before the device is put into operation. Following that, the device will maintain the sub-atmospheric pressure at least substantially automatically. This takes place in that gas from the pressure chamber will be carried along in the liquid flow from the inner back pressure vessel (3), via the flow threshold (6) to the inner pressure vessel (2). Subfigure I shows the situation in which no liquid flow takes place. A state of equilibrium prevails, because the upward force being exerted on the float (39) by the liquid in the pressure chamber is not sufficiently strong for opening the valve (41). Subfigure II shows the situation in which the liquid level in the outer back pressure vessel (4) has risen in comparison with the situation shown in Subfigure I. As a result of this, the liquid level in the inner back pressure vessel (3) will rise. As a result of said rise, an upward force will be exerted on the float (39), which will push the valve (41) upwards via the rod (40). This will cause the opening (8) to open. As a result of this, gas will flow into the pressure chamber (5), and the underpressure that prevails therein will be reduced. Said reduction of the underpressure (that is, the pressure increase) will cause the liquid level in the inner back pressure vessel (3) to fall again. The higher pressure causes the liquid to move upwards, as it were. Eventually the liquid level will have fallen so far, that the opening (8) is closed again by the valve (41). The liquid flow over the flow threshold (6) will be maintained, as a result of which gas will be discharged (via the liquid flow) from the pressure chamber (5). This causes the underpressure to rise, as a result of which the liquid level in the inner back pressure vessel (3) will rise again. In this manner a constant liquid level will be maintained in the inner back pressure vessel (3), as a result of which the flow through the device will remain constant as well. The magnitude of the flow can be varied by varying the length of the rod (40). Instead of using a float and a rod, it is also possible to use a different control system, wherein the liquid level is measured by a sensor.

FIG. 12 is a diagrammatic longitudinal section of an embodiment of the device according to the invention, which functions as a backflow protection device, wherein various stages of a control process are shown. Subfigures I and II show two control process situations. The device comprises an outer pressure vessel (1), an inner pressure vessel (2), an inner back pressure vessel (3), an outer back pressure vessel (4), a pressure chamber (5) and inlets (7∩, 7∩∩, 7∩∩∩). The pressure chamber (5) comprises a flow threshold (6). Liquid can flow into or out of the system through said inlets. The device also comprises a float (39), which is connected, via a rod (40), to a valve (41), which valve is capable of closing or opening an opening (8) in the pressure chamber (5), in which manner the pressure in the pressure chamber (5) can be controlled. The desired direction of flow is from the inner back pressure vessel (3) to the inner pressure vessel (2). During operation the device ensures that no backflow can occur. Backflow is flow from the inner pressure vessel (2) to the inner back pressure vessel (3). Subfigure I shows the situation in which through-flow takes place. As is the case with the device shown in FIG. 11, an underpressure prevails in the pressure chamber (5), which underpressure is maintained as a result of the discharge of gas via the liquid flow. If the liquid level in the outer pressure vessel (1) rises, the liquid level in the inner pressure vessel (2) will rise as well. This will cause the float (39) to rise. The valve (41) will open the opening (8), as a result of which gas will flow into the pressure chamber (5). As a result of this the underpressure in the pressure chamber (5) will decrease, causing the liquid level in the inner pressure vessel (2) and in the inner back pressure vessel (3) to fall. This situation is shown in Subfigure II. This will prevent the occurrence of a backflow.

FIG. 13 is a diagrammatic longitudinal section of an embodiment of the device according to the invention, which functions as a backflow protection device, and which maintains a constant difference between two liquid levels, wherein various stages of a control process are shown. The device comprises an outer pressure vessel (1), an inner pressure vessel (2), an inner back pressure vessel (3), an outer back pressure vessel (4), a pressure chamber (5) and inlets (7∩, 7∩∩, 7∩∩∩). The pressure chamber (5) comprises a flow threshold (6). Liquid can flow into or out of the system through said inlets. During operation an underpressure prevails in the pressure chamber (5). The device also comprises a float (39), which is connected, via a rod (40), to a valve (41), which valve is capable of closing or opening an opening (8) in the pressure chamber (5), in which manner the pressure in the pressure chamber (5) can be controlled. During operation the device maintains a constant difference between the level of the liquid in the outer pressure vessel (1) and the level of the liquid in the outer back pressure vessel (4). Subfigure I shows a situation in which there is a state of equilibrium. The difference between the level of liquid in the outer pressure vessel (1) and that in the outer back pressure vessel (4) is P1. This is equal to the difference between the level of liquid in the inner pressure vessel (2) and that in the inner back pressure vessel (3), which difference is indicated at P2. When level of liquid in the outer back pressure vessel (4) rises, also the level of liquid in the inner back pressure vessel (3) will rise, as a result of which a through-flow will take place. Said through-flow will be maintained until the liquid level in the outer pressure vessel (1) has risen so high that S1 (equal to S2) is equal to the difference between the level of liquid in the outer back pressure vessel (4) and the level of the flow threshold (6). In that case the difference between the level of liquid in the outer pressure vessel (1) and the level of liquid in the outer back pressure vessel (4) will be equal to P1 (=P2) again. This situation is shown in Subfigure II. If the level of liquid in the outer pressure vessel (1) falls, also the level of liquid in the inner pressure vessel (2) will fall, and through-flow will take place. Said through-flow will be maintained until the liquid level has fallen so far, that S1

(=S2) is equal to the difference between the liquid level in the outer back pressure vessel (4) and the level of the flow threshold (6). In that case the difference between the level of liquid in the outer pressure vessel (1) and the level of liquid in the outer back pressure vessel (4) will be equal to P1 (=P2) again. If the level of liquid in the outer back pressure vessel (4) falls or if the level of liquid in the outer pressure vessel rises, no through-flow will be effected. Consequently there will be no backflow (from the inner pressure vessel to the inner back pressure vessel). This embodiment of the device according to the invention may be suitably used in water drainage systems, such as rivers and brooks. If the water level on one side of the device rises or falls, it will also do so on the other side. This makes it possible to adapt the water level to the season, whilst retaining the difference in the water levels across a weir. This may be of significance in connection with the slope of the adjoining land.

FIG. 14 is a diagrammatic longitudinal section of an embodiment of the device according to the invention, which functions as a weir, wherein various stages of a control process are shown. Subfigures I and II show two control process situations. The device comprises an outer pressure vessel (1), an inner pressure vessel (2), an inner back pressure vessel (3), an outer back pressure vessel (4), a pressure chamber (5) and inlets (7∩, 7∩∩, 7∩∩∩). The pressure chamber (5) comprises a flow threshold (6). During operation an underpressure prevails in the pressure chamber (5). Liquid can flow into or out of the system through said inlets. The device also comprises a first float (39), which is connected, via a rod (40), to a valve (41), which valve is capable of closing or opening an opening (8) in the pressure chamber (5), and a second float (44), which is connected, via a rod (45), to a valve (46), which valve is capable of closing or opening an opening (42) in the pressure chamber (5), in which manner the pressure in the pressure chamber (5) can be controlled. The opening (42) connects the pressure chamber (5) on one side to a tube (43), whose other end is present inside the outer back pressure vessel. The weir action is as follows: if the level of liquid in the outer back pressure vessel rises above a predetermined height, a through-flow will take place in the direction of inlet 7. Subfigure I shows the situation in which no through-flow takes place. If the level of liquid in the outer back pressure vessel (4) rises, also the level of liquid in the inner back pressure vessel (3) will rise. When a predetermined level is reached, the second float (44) will move upwards and the opening (42) will open, as a result of which gas from the atmosphere can enter the pressure chamber (5). This will lead to a decrease of the underpressure, as a result of which the level of liquid in the inner back pressure vessel (3) will fall again. Thus there is a state of equilibrium, in which no through-flow takes place. If the level of liquid in the outer back pressure vessel (4) rises so high that it shuts off the tube (43), the situation will be different, however. This situation is shown in Subfigure II. Also here the rise of the liquid in the outer back pressure vessel (4) will cause the liquid in the inner back pressure vessel (3) to rise, and the opening (42) will open. In this case, however, the pressure chamber (5) will not be placed into communication with the atmosphere. The underpressure will be maintained, so that there will be a through-flow. The float (39) operates the valve (41) via the rod (40), which valve can open or close the opening (8) so as to reduce the flow, as is shown in FIG. 11. It is also possible to leave out this flow-reducing system.

FIG. 15 is a longitudinal section of an embodiment of the device according to the invention, which maintains the liquid surface in the outer pressure vessel at a predetermined level, provided the liquid surface in the inner pressure vessel is higher than a predetermined other level, wherein various stages of a control process are shown. Subfigures I, II and III show three control process situations. The device comprises an outer pressure vessel (1), an inner pressure vessel (2), an inner back pressure vessel (3), an outer back pressure vessel (4), a pressure chamber (5) and inlets (7∩, 7∩∩, 7∩∩∩). The pressure chamber (5) comprises a flow threshold (6). During operation an underpressure prevails in the pressure chamber (5). Liquid can flow into or out of the system through said inlets. The device also comprises a first float (39), which is connected, via a rod (40), to a valve (41), which valve is capable of closing or opening an opening (8) in the pressure chamber (5), and a second float (44), which is connected, via a rod (45), to a valve (46), which valve is capable of closing or opening an opening (42) in the pressure chamber (5), in which manner the pressure in the pressure chamber (5) can be controlled. The opening (42) connects the pressure chamber (5) on one side to a tube (43), whose other end is present inside the outer back pressure vessel. The device furthermore comprises a third float (47), which is connected, via a rod (48), to a valve (49), which valve is capable of closing or opening an opening (50). Said opening (50) is present in the wall of the tube (43). This embodiment of the device operates in a similar manner as the embodiment shown in FIG. 14, with this difference that the present embodiment comprises an additional control possibility. If the liquid in the outer pressure vessel (1) is not in contact with the third float (47), the operation of this device will be the same as that of the device shown in FIG. 14. This situation is illustrated in Subfigures I and II. As soon as the float (47) is pushed up by the liquid in the outer pressure vessel, the opening (50) will open. In this situation the upward movement of the float (44) will place the pressure chamber (5) into communication with the atmosphere via the opening (42), the tube (43) and the opening (50). The resulting decrease of the underpressure will prevent the through-flow of liquid. This situation is shown in Subfigure III. Thus a predetermined liquid level will be maintained in the outer pressure vessel once the liquid level in the outer back pressure vessel is high enough.

FIG. 16 is a diagrammatic vertical cross-section of two liquid basins comprising an interconnection which incorporates an embodiment of the device according to the invention. A first liquid basin (24) and a second liquid basin (25) are separated from each other by a wall. At the place where the device according to the invention is located, the wall is lower than elsewhere, forming an inner wall (26) at this location. The device itself comprises an outer shell (27), which is just as high or higher than the wall outside the device. The outer shell (27) is provided with openings (38), through which liquid can flow. Outer walls (29, 29∩) are present beside the shell (27). The device comprises an outer pressure vessel (1), an inner pressure vessel (2), an inner back pressure vessel (3), an outer back pressure vessel (4), and a pressure chamber (5). The pressure chamber (5) comprises a flow threshold (6). In this case the flow threshold is made up of the upper side of the wall (26) within the shell (27). Gas can be carried into and out of the pressure chamber (5) via the opening (8). The figure shows a state of equilibrium. The liquid levels S1 and S2 are the same. In this situation no liquid will flow over the inner wall (26). As can be seen from the figure, the first liquid basin (24) is practically full, and the second liquid basin (25) is practically empty. The device according to the invention thus makes it possible to carry out maintenance work on the second liquid basin (25) without having to empty the first basin (24) first. The device according to the invention can be used advantageously in particular in water purification plants.

Figure 17A:
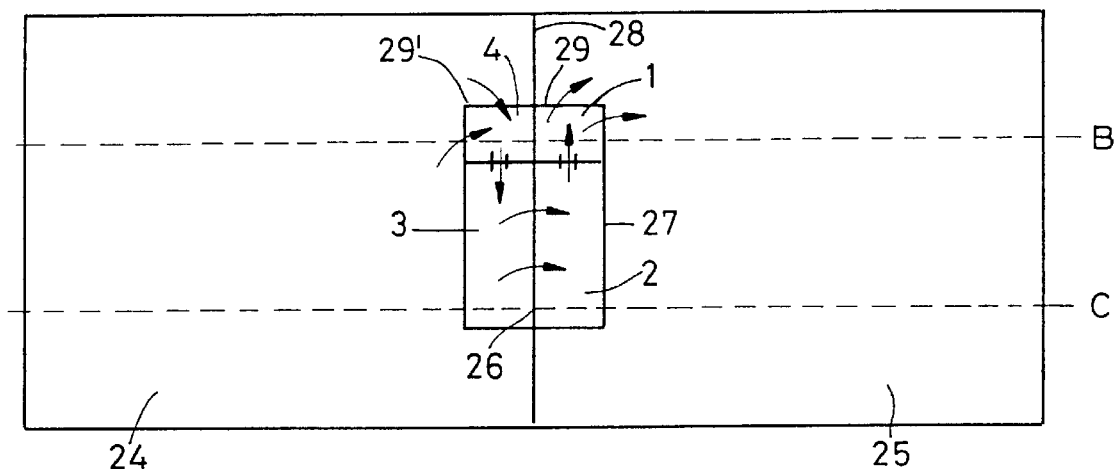
FIG. 17A is a diagrammatic horizontal cross-section of two liquid basins comprising an interconnection which incorporates an embodiment of the device according to the invention.
Figure 17B:
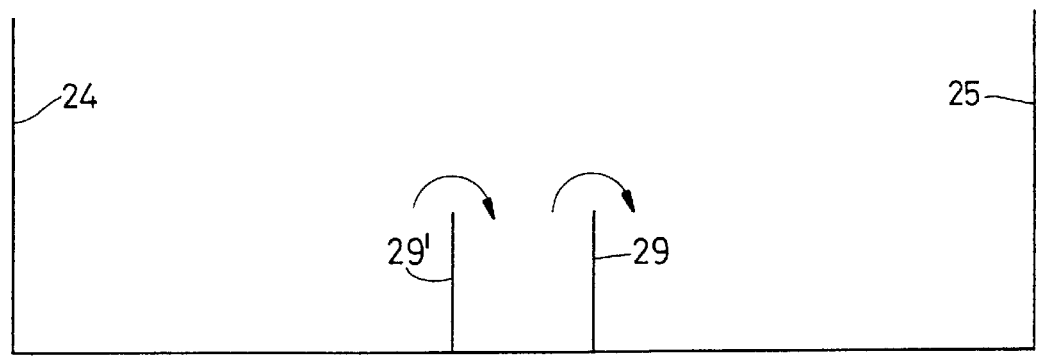
FIG. 17B is a diagrammatic vertical cross-section of two liquid basins comprising an interconnection which incorporates an embodiment of the device according to the invention.
Figure 17C:
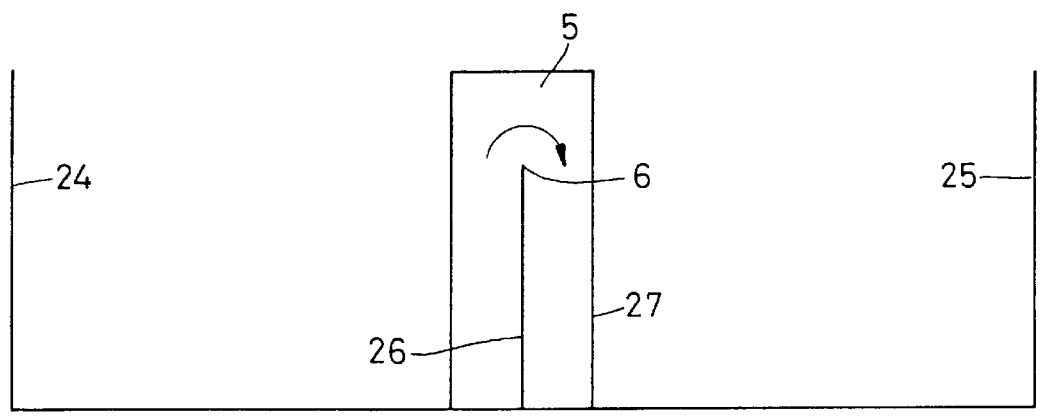
FIG. 17C is a diagrammatic vertical cross-section of two liquid basins comprising an interconnection which incorporates an embodiment of the device according to the invention.

FIG. 17A is a diagrammatic horizontal cross-section of two liquid basins comprising an interconnection which incorporates an embodiment of the device according to the invention. FIG. 17B is a vertical cross-section along line B in FIG. 17A. FIG. 17C is a diagrammatic vertical cross-section along line C in FIG. 17A. The device comprises an outer pressure vessel (1), an inner pressure vessel (2), an inner back pressure vessel (3), an outer back pressure vessel (4), and a pressure chamber (5). The pressure chamber (5) comprises a flow threshold (6). The basins (24, 25) are separated from each other by a wall (28). Within the shell (27) the wall is lower, forming the inner wall (26). This embodiment functions in substantially the same manner as the embodiment shown in FIG. 16. The arrows indicate the direction of flow of the liquid when liquid flows from the first liquid basin (24) into the second liquid basin (25). In this embodiment the outer walls (29, 29∩) are positioned in line with the shell, so that they do not interfere with a flow that may take place in the basins (24, 25).

FIG. 18 is a diagrammatic cross-section of an embodiment of the device according to the invention, which is used in a pipe under a dyke (37), wherein various stages of a control process are shown. The device comprises an outer pressure vessel (1), an inner pressure vessel (2), an inner back pressure vessel (3), an outer back pressure vessel (4), and a pressure chamber (5). The pressure- chamber (5) comprises an opening (8) and a flow threshold (6). The opening can be closed by means of a stop valve (9). Present on a first side of the dyke (37) is a first liquid reservoir (30), whilst a second liquid reservoir (31) is present on another side of the dyke (37). Subfigure I shows the situation in which the opening (8) is not closed. The water level is everywhere the same. In Subfigure II the opening (8) is closed by the valve (9). In this situation there is a difference between the water level in the first liquid reservoir (30) and that in the second liquid reservoir (31). In this situation the liquid system is in a state of equilibrium. The level differences S1 and S2 are the same.

FIG. 19 is a diagrammatic cross-section of an embodiment of the device according to the invention, which is used in a pipe under a dyke (37), and by means of which a constant flow can be maintained. The device comprises an outer pressure vessel (1), an inner pressure vessel (2), an inner back pressure vessel (3), an outer back pressure vessel (4), and a pressure chamber (5). The pressure chamber (5) comprises an opening (8) and a flow threshold (6). The opening can be closed by means of a stop valve (9). The device comprises a breather tube (23), by means of which the flow can be controlled.

FIG. 20 is a diagrammatic cross-section of an embodiment of the device according to the invention, which is incorporated between a sewage drain (53) and a buffer settling basin (51), wherein various stages of a control process are shown. The device comprises an outer pressure vessel (1), an inner pressure vessel (2), an inner back pressure vessel (3), and an outer back pressure vessel (4). A first overflow edge (52) is present between the sewage drain (53) and the buffer settling basin (51), and a second overflow edge (54) is present between the buffer settling basin and the ground water (55). Furthermore a supply sewer (55) may be present. The sewage water may also flow directly from a surface, such as a street, into the sewage drain (53). In this figure the through-flow area of the inner back pressure vessel (3) is larger than that of the inner pressure vessel. This enables a deep position of the bottom of the buffer settling basin, thus providing a larger capacity. The operation of part of this system is the same as in FIG. 3. The function of a buffer settling basin is to buffer sewage water and possibly allow solids which are present in the sewage water to settle, if there is so much precipitation that the capacity of the sewage system is insufficient. It is desirable that the buffer settling basin (51) is not filled with sewage water that is discharged in dry weather conditions, because it will quickly foul up in those circumstances. If there has been an excessive amount of precipitation, the sewage water will run over the second overflow edge (54) into the surface water (55). Subfigure I shows the situation in dry weather conditions. The amount of sewage water will be small in those circumstances. No sewage water will flow into the buffer settling basin. Subfigure II shows the situation when there has been a great deal of precipitation. The sewage water flows over the first overflow edge (52) and fills the buffer settling basin. In that case there will be no through-flow through the inner pressure vessels (2, 3). Subfigure III shows the situation in which the buffer settling basin contains sewage water and the sewage water level in the sewage drain is low. Now sewage water runs from the buffer settling basin into the sewage drain (53) via the inner pressure vessels (2, 3).

Figure 21:
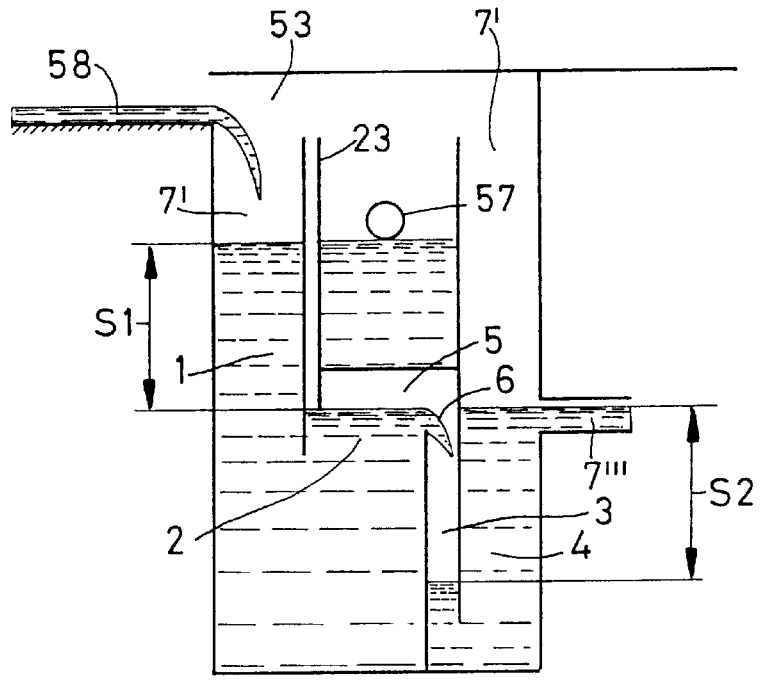
FIG. 21 is a diagrammatic cross-section of an embodiment of the device according to the invention as shown in FIG. 9, which is installed in a sewage drain.

FIG. 21 is a diagrammatic cross-section of an embodiment of the device according to the invention as shown in FIG. 9, which is installed in a sewage drain (53). The parts used are the same as in FIG. 9, with the addition of a discharge sewer (57). The device functions to limit the flow through inlet 7∩∩∩ to a predetermined value. If the supply of sewage water is larger than this flow, the sewage water level in the drain (53) will rise. Once said level has exceeded a predetermined value, the sewage water will be discharged through the discharge sewer. The first rain water that falls is much more polluted than the rain that falls later. The illustrated device makes it possible to separate these two types of water. The first rain water that falls, which is polluted, is discharged via inlet 7∩∩∩, which is connected to a water purification plant. The cleaner rain water that falls later can be led elsewhere via the discharge sewer (57). It may be filtrated into the ground, for example.

Figure 22:
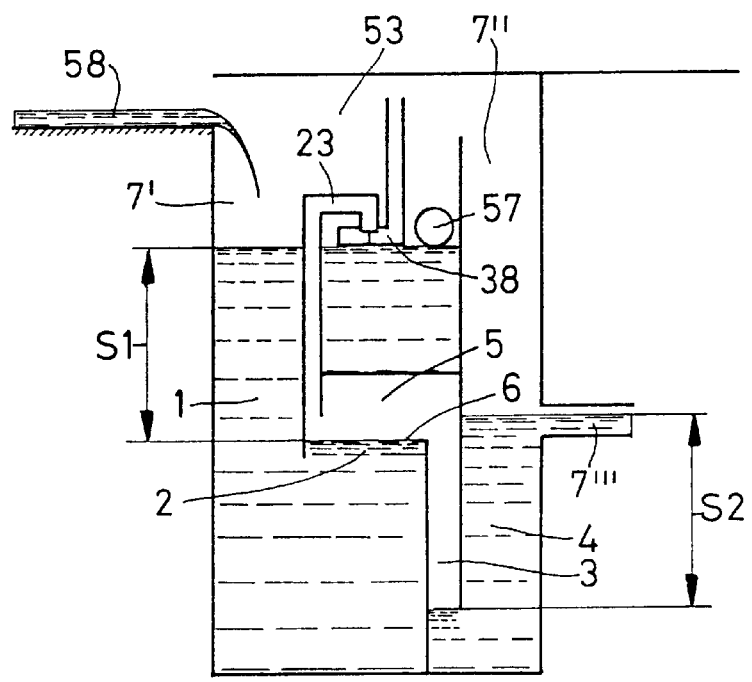
FIG. 22 is a diagrammatic cross-section of an embodiment of the device according to the invention as shown in FIG. 10, which is installed in a sewage drain.

FIG. 22 is a diagrammatic cross-section of an embodiment of the device according to the invention as shown in FIG. 10, which is installed in a sewage drain (53). The parts used are the same as in FIG. 10, with the addition of a discharge sewer (57) and a surface (58), such as a street. The operation of the device will be the same as that of the device shown in FIG. 21 as long as the liquid level in the sewage drain (53) remains below a predetermined value. When the liquid level in the sewage drain (53) exceeds that value, the valve (38) will shut off the breather tube (23). The pressure chamber (5) will no longer be in communication with the atmosphere in that case, and the discharge via inlet 7∩∩∩ will be stopped.

Figure 23:
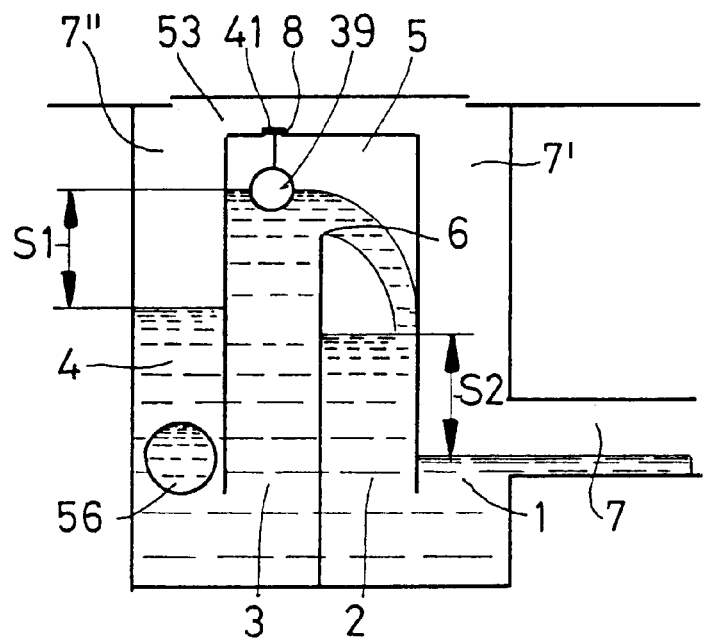
FIG. 23 is a diagrammatic cross-section of the embodiment of the device according to the invention that is shown in FIG. 11, which is installed in a sewage drain.

FIG. 23 is a diagrammatic cross-section of the embodiment of the device according to the invention that is shown in FIG. 11, which is installed in a sewage drain (53). The parts used are the same as in FIG. 11, but in this embodiment inlet 7∩∩∩ is a discharge sewer (56). The operation of the device is the same as that of the device which is shown in FIG. 11. The flow from the inner back pressure vessel (3) to the inner pressure vessel (2) is limited.

Figure 24:
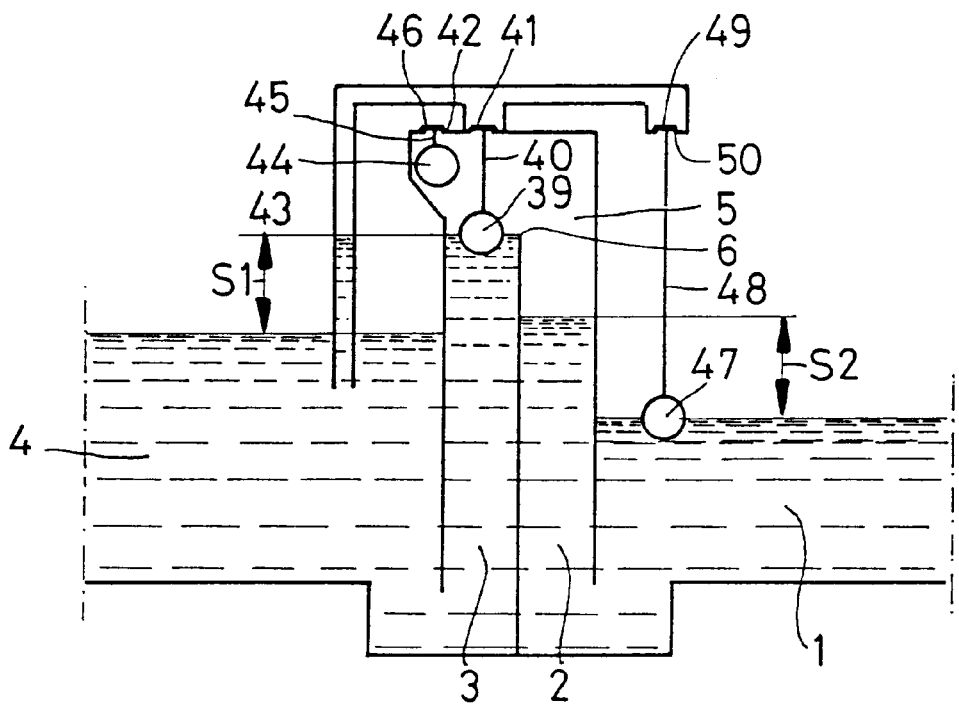
FIG. 24 is a diagrammatic cross-section of the embodiment of the device according to the invention that is shown in FIG. 15, which is installed in a brook.

FIG. 24 is a diagrammatic cross-section of the embodiment of the device according to the invention that is shown in FIG. 15, which is installed in a brook. The parts used are the same as in FIG. 15, but there are no inlets. The outer pressure vessel (1) and the outer back pressure vessel (4)

form part of the brook. The operation is the same as that of the device shown in FIG. 15. The liquid level in the outer pressure vessel will remain at a predetermined value, provided the level of the liquid in the inner back pressure vessel exceeds a predetermined other value.

Figure 25:
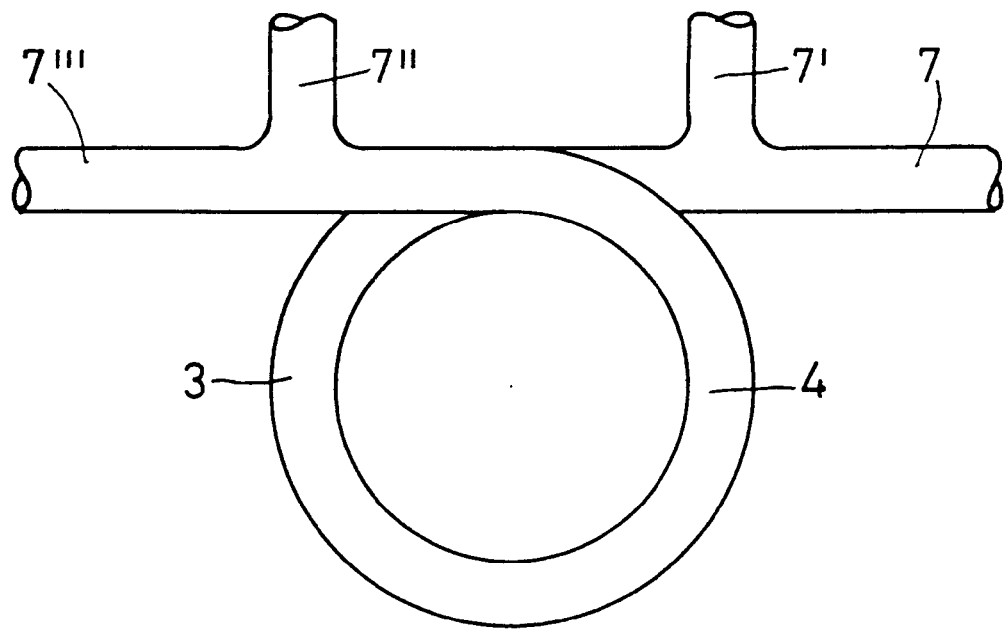
FIG. 25 is a diagrammatic side view of a spiral-shaped embodiment of the device according to the invention.

FIG. 25 is a diagrammatic side view of a spiral-shaped embodiment of the device according to the invention. The device comprises an outer pressure vessel (1), an inner pressure vessel (2), an inner back pressure vessel (3), and an outer back pressure vessel (4), and inlets (7, 7∩, 7∩∩, 7∩∩∩). Liquid can flow into or out of the system through said inlets. Of course the device may also comprise more inlets, or fewer. The advantage of the spiral shape is that a much better through-flow occurs during operation.

Figure 26:
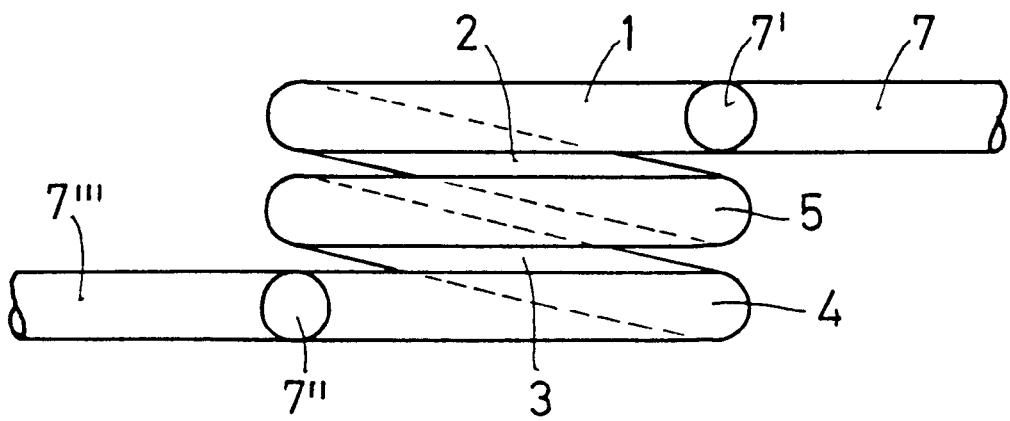
FIG. 26 is a diagrammatic plan view of the embodiment of the spiral-shaped device according that is shown in FIG. 25.

FIG. 26 is a diagrammatic plan view of the embodiment of the spiral-shaped device according that is shown in FIG. 25.

What is claimed is:

1. A device for controlling a liquid flow passing through the device, which device forms a system of communicating vessels comprising a pressure chamber with a flow threshold, an outer vessel and an inner vessel placed upstream from the pressure chamber and an inner vessel and an outer vessel placed downstream from the pressure chamber, whereby during operation the liquid flow can be controlled by means of the pressure of a gas present in the pressure chamber, and gas for creating a pressure in the pressure chamber being transported into the pressure chamber due to turbulence created in the liquid flow when entering the device, said gas being transported with the liquid into the pressure chamber from the outer upstream vessel to the inner upstream vessel and first means being present for allowing the entry of gas into the pressure chamber.

2. A device according to claim 1, wherein said first means are formed by a connection between the outer and inner upstream vessel, wherein a highest point of said connection lies above a lowest point through which gas is transported by the turbulence of the liquid flow.

3. A device according to claim 1, wherein a highest point of a connection between the outer and inner upstream vessel lies above the threshold.

4. A device according to claim 1, wherein means are present, which permit the discharge of gas from the pressure chamber.

5. A device according to claim 4, wherein the means comprise at least one opening.

6. A device according to claim 5, wherein the opening is placed in a wall of the pressure chamber above the threshold.

7. A device according to claim 5, wherein the opening is formed by means of a connection between the inner upstream vessel and the outer upstream vessel.

8. A device according to claim 1, wherein an opening is present in a wall of the outer upstream vessel.

9. A device according to claim 1, incorporated in a manhole, a catchbasin, a dyke, or a sewerage.

* * * * *